United States Patent
Park et al.

(10) Patent No.: US 12,193,030 B2
(45) Date of Patent: Jan. 7, 2025

(54) METHOD AND APPARATUS FOR UPLINK DATA INFORMATION TRANSMISSION IN WIRELESS COMMUNICATION SYSTEM

(71) Applicant: Samsung Electronics Co., Ltd., Suwon-si (KR)

(72) Inventors: Sungjin Park, Suwon-si (KR); Jinyoung Oh, Suwon-si (KR); Youngbum Kim, Suwon-si (KR); Hyunseok Ryu, Suwon-si (KR); Cheolkyu Shin, Suwon-si (KR); Jeongho Yeo, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/425,622

(22) Filed: Jan. 29, 2024

(65) Prior Publication Data

US 2024/0179717 A1 May 30, 2024

Related U.S. Application Data

(63) Continuation of application No. 18/295,591, filed on Apr. 4, 2023, now Pat. No. 11,924,854, which is a
(Continued)

(30) Foreign Application Priority Data

Aug. 4, 2020 (KR) .................. 10-2020-0097495
May 20, 2021 (KR) .................. 10-2021-0065044

(51) Int. Cl.
*H04W 72/21* (2023.01)
*H04L 27/26* (2006.01)
(Continued)

(52) U.S. Cl.
CPC ......... *H04W 72/23* (2023.01); *H04L 27/2607* (2013.01); *H04W 72/0446* (2013.01);
(Continued)

(58) Field of Classification Search
CPC ............. H04W 72/23; H04W 72/1268; H04W 72/0446; H04W 72/0453; H04W 72/21; H04W 74/0816; H04L 27/2607
See application file for complete search history.

(56) References Cited

U.S. PATENT DOCUMENTS

2020/0052827 A1  2/2020  Vilaipornsawai et al.
2021/0307070 A1  9/2021  Kim et al.
(Continued)

FOREIGN PATENT DOCUMENTS

EP         3 609 104 A1    2/2020
KR    10-2021-0017748 A    2/2021

OTHER PUBLICATIONS

International Search Report dated Nov. 8, 2021, issued in an International Application No. PCT/KR2021/010009.
(Continued)

*Primary Examiner* — Kent Krueger
(74) *Attorney, Agent, or Firm* — Jefferson IP Law, LLP

(57) ABSTRACT

The disclosure relates to a communication technique for combining an IoT technology with a 5G communication system for supporting a higher data transmission rate than that of a beyond-4G system, and a system therefor. The disclosure may be applied to intelligent services (for example, smart homes, smart buildings, smart cities, smart cars or connected cars, health care, digital education, retail businesses, security and safety related services, and the like) based on 5G communication technologies and IoT-related technologies. A method performed by a terminal in a wireless communication system is provided, the method includes
(Continued)

receiving configured grant (CG)-physical uplink shared channel (PUSCH) configuration information, identifying a plurality of actual repetition PUSCHs based on a PUSCH repetition transmission type B and the CG-PUSCH configuration information, identifying whether 1 symbol actual repetition PUSCH is included in the plurality of actual repetition PUSCHs, and in case that the 1 symbol actual repetition PUSCH is included in the plurality of actual repetition PUSCHs and is related to uplink transmission in an unlicensed band, transmitting the 1 symbol actual repetition PUSCH.

20 Claims, 14 Drawing Sheets

Related U.S. Application Data continuation of application No. 17/389,958, filed on Jul. 30, 2021, now Pat. No. 11,690,076.

(51) Int. Cl.
    *H04W 72/0446*    (2023.01)
    *H04W 72/0453*    (2023.01)
    *H04W 72/1268*    (2023.01)
    *H04W 72/23*    (2023.01)
    *H04W 74/0816*    (2024.01)

(52) U.S. Cl.
    CPC ... *H04W 72/0453* (2013.01); *H04W 72/1268* (2013.01); *H04W 72/21* (2023.01); *H04W 74/0816* (2013.01)

(56) References Cited

U.S. PATENT DOCUMENTS

| | | |
|---|---|---|
| 2022/0038218 A1 | 2/2022 | Kim et al. |
| 2022/0086915 A1 | 3/2022 | Canonne-Velasquez et al. |
| 2022/0287096 A1 | 9/2022 | Talarico et al. |
| 2023/0148270 A1 | 3/2023 | Li et al. |

OTHER PUBLICATIONS

Huawei et al., 'Corrections on configured grant transmission', R1-2003526, 3GPP TSG RAN WG1, Meeting #101-e, May 16, 2020.
Sharp, 'Remaining issues on PUSCH enhancements for NR URLLC', R1-2004332, 3GPP TSG RAN WG1, Meeting #101-e, May 16, 2020.
OPPO, 'Configured grant enhancements for URLLC', R1-2004119, 3GPP TSG RAN WG1, Meeting #101-e, May 16, 2020.
Moderator Vivo, "Feature lead summary NRU-CG-02", 3GPP TSG RAN WG1 #100bis, Apr. 29, 2020, pp. 1-16, XP009543637.
AT&T et al., "RAN1 UE features list for Rel-16 NR after RAN1 #100-E", 3GPP DRAFT, R1-2001484, 3GPP TSG RAN WG1 #100-e, e-Meeting, Feb. 24, 2020-Mar. 6, 2020, Apr. 10, 2020, XP051873231.
Trung-Kien Le et al., "Enhancements of PUSCH repetitions for URLLC in licensed and unlicensed spectrum", 2021 17th International Symposium on Wireless Communication Systems (ISWCS), IEEE, Sep. 6, 2021, pp. 1-6, XP033987829.
Extended European Search Report dated Oct. 24, 2023, issued in European Patent Application No. 21854228.0.

METHOD AND APPARATUS FOR UPLINK DATA INFORMATION TRANSMISSION IN WIRELESS COMMUNICATION SYSTEM

CROSS-REFERENCE TO RELATED APPLICATION(S)

This application is a continuation application of prior application Ser. No. 18/295,591 filed on Apr. 4, 2023; which is a continuation application of prior application Ser. No. 17/389,958 filed on Jul. 30, 2021, which has issued as U.S. Pat. No. 11,690,076 on Jun. 27, 2023; and which is based on and claims priority under 35 U.S.C § 119 (a) of a Korean patent application number 10-2020-0097495 filed on Aug. 4, 2020 in the Korean Intellectual Property Office, and of a Korean patent application number 10-2021-0065044 filed on May 20, 2021 in the Korean Intellectual Property Office, the disclosure of each of which is incorporated by reference herein in its entirety.

BACKGROUND

1. Field

The disclosure relates to a method for transmitting control information in a wireless communication system.

2. Description of Related Art

To meet the demand for wireless data traffic having increased since deployment of $4^{th}$ Generation (4G) communication systems, efforts have been made to develop an improved $5^{th}$ Generation (5G) or pre-5G communication system. Therefore, the 5G or pre-5G communication system is also called a "Beyond 4G Network" or a "Post Long-Term Evolution (LTE) System". The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like. In the 5G system, hybrid frequency shift keying (FSK) and frequency quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above may be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for transmitting uplink data information in a wireless communication system.

Another aspect of the disclosure is to provide a method and an apparatus wherein, in case that a terminal transmits uplink data information, data information requiring a high level of reliability can be transmitted in a short latency time regardless of slot boundaries and downlink and uplink switching intervals.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving configured grant (CG)-physical uplink shared channel (PUSCH) configuration information, identifying a plurality of actual repetition PUSCHs based on a PUSCH repetition transmission type B and the CG-PUSCH configuration information, identifying whether 1 symbol actual repetition PUSCH is included in the plurality of actual repetition PUSCHs, and in case that the 1 symbol actual repetition PUSCH is included in the plurality of actual repetition PUSCHs and is related to uplink transmission in an unlicensed band, transmitting the 1 symbol actual repetition PUSCH.

In accordance with another aspect of the disclosure, a method is provided. The method includes transmitting configuration information including PUSCH resource information, transmitting downlink control information, and repeatedly receiving identical uplink data information by using a PUSCH resource including continuous symbols determined based on the downlink control information and the configuration information.

In accordance with another aspect of the disclosure, a terminal is provided. The terminal includes a transceiver, and a controller configured to receive configured grant (CG)-physical uplink shared channel (PUSCH) configuration information, identify a plurality of actual repetition PUSCHs based on a PUSCH repetition transmission type B and the CG-PUSCH configuration information, identify whether 1 symbol actual repetition PUSCH is included in the plurality of actual repetition PUSCHs, and in case that the 1 symbol actual repetition PUSCH is included in the plurality of actual repetition PUSCHs and is related to uplink transmission in an unlicensed band, transmit the 1 symbol actual repetition PUSCH.

In accordance with another aspect of the disclosure, a base station is provided. The base station includes a transceiver, and a controller configured to transmit configuration information including resource information, transmit downlink control information, and repeatedly receive identical uplink data information by using a PUSCH resource including continuous symbols determined based on the downlink control information and the configuration information.

According to disclosed embodiments, a method and an apparatus for transmitting uplink data information in a wireless communication system may be provided.

According to disclosed embodiments, services may be effectively provided in a wireless communication system. Specifically, a method provided in the disclosure may enable a terminal to detect control information transmitted from a base station within a short period of time with a high level of reliability.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
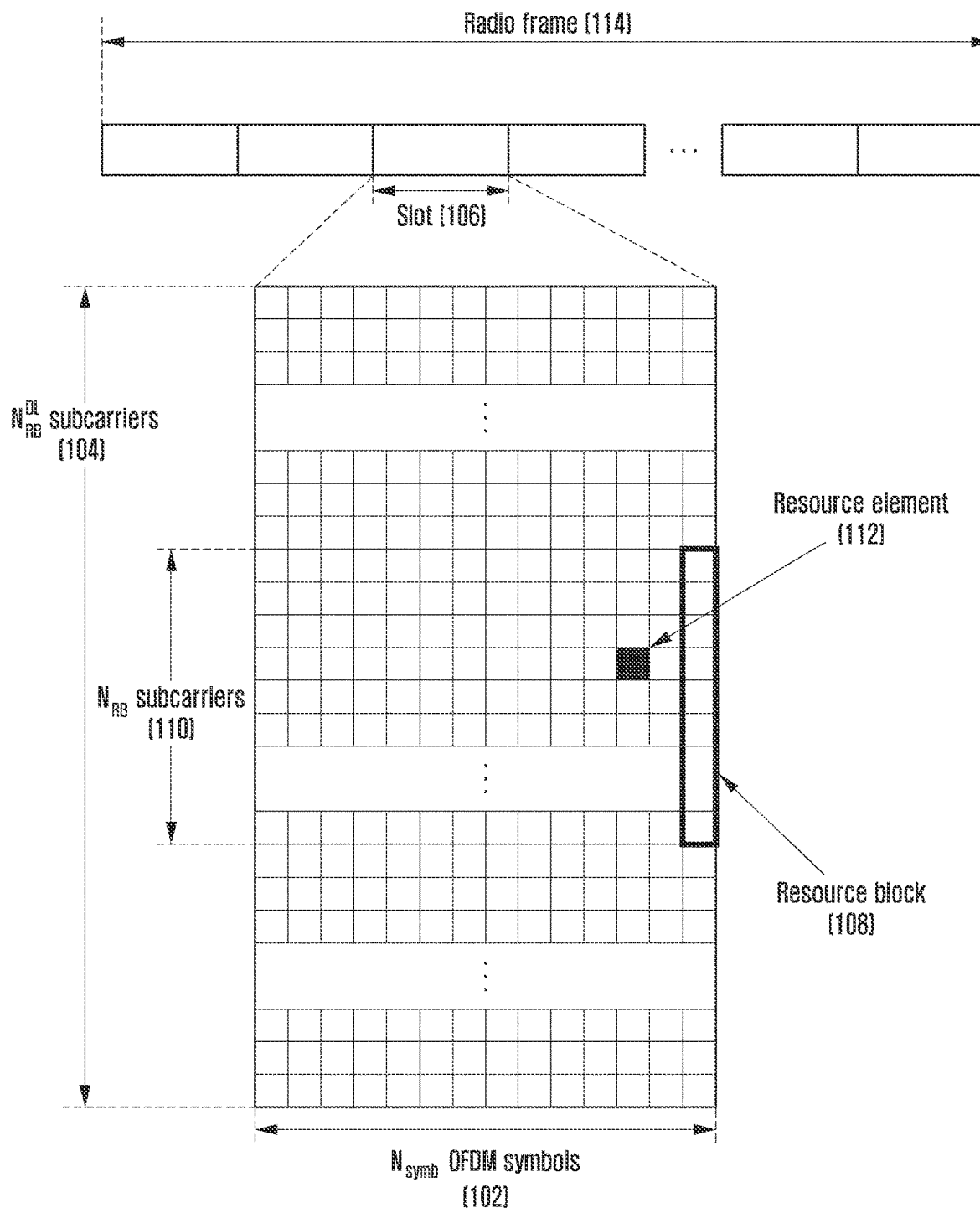
FIG. 1 illustrates a transmission structure of a time-frequency domain, which is a radio resource domain of a 5G or new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents. It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system has evolved into a broadband wireless communication system that provides a high speed and high quality packet data service, like the communication standards of, for example, high speed packet access (HSPA), long term evolution (LTE or evolved universal terrestrial radio access (E-UTRA)), and LTE-advanced (LTE-A) of third generation partnership project (3GPP), high rate packet data (HRPD) and ultra-mobile broadband (UMB) of 3GPP2, 802.16e of Institute of Electrical and Electronics Engineers (IEEE), and the like, departing from the early stage of providing only voice-oriented services. In addition, a communication standard of 5G or new radio (NR) is being made in connection with a 5G wireless communication system.

A 5G or NR system, which is a representative example of the broadband wireless communication systems, adopts an orthogonal frequency division multiplexing (OFDM) scheme in the downlink (DL) and in the uplink. More specifically, a cyclic-prefix OFDM (CP-OFDM) scheme is employed in the DL, and a discrete Fourier transform spreading OFDM (DFT-S-OFDM) scheme together with the CP-OFDM are employed in the uplink.

The uplink refers to a radio link through which a terminal (user equipment (UE)) or a mobile station (MS) transmits data or control signals to a base station (gNode B, eNode, or BS). The downlink refers to a radio link through which a base station transmits data or control signals to a terminal. In multiple access schemes as described above, time-frequency resources, on which data or control information is to be carried to each user, are usually allocated and managed to satisfy orthogonality, i.e., not to overlap each other, so as to enable data or control information for each user to be distinguished.

If a decoding failure occurs in the initial transmission, the 5G or NR system employs a hybrid automatic repeat request (HARQ) scheme for retransmitting the corresponding data in a physical layer. A HARQ scheme is designed to operate in such a way that if a receiver fails to accurately decode data, the receiver transmits information, that is, a negative acknowledgement (NACK), indicative of the decoding failure to a transmitter, thus enabling the transmitter to retransmit the corresponding data in the physical layer. The receiver may combine data retransmitted from the transmitter and previous data, decoding of which has failed, whereby data reception performance may increase. In addition, if the receiver accurately decodes data, the receiver transmits information acknowledgement (ACK) indicating that decoding is successfully executed, and thus enables the transmitter to transmit new data.

Meanwhile, new radio access technology (NR), which is new 5G communication, is designed to enable various services to be freely multiplexed in time and frequency resources. Accordingly, in the NR system, a waveform/numerology, a reference signal, and the like may be dynamically or freely allocated according to the needs of a corresponding service. In order to provide an optimal service to a terminal in wireless communication, it is required to perform data transmission optimized based on measurements of channel quality and interference. Accordingly, it is essential to accurately measure a channel state. However, unlike 4G communication for which the channel and interference characteristics are dramatically changed depending on a frequency resource, the channel and interference characteristics are dramatically changed depending on a service in a case of a 5G or NR channel. Accordingly, subset support in a frequency resource group (FRG) dimension may be required in order to separately measure channel and interference characteristics for each frequency resource.

Meanwhile, the types of services supported in the 5G or NR system may be categorized into enhanced mobile broadband (eMBB), massive machine type communications (mMTC), and ultra-reliable and low-latency communications (URLLC). The eMBB may be a service that targets high-speed transmission of high-capacity data. The mMTC may be a service that targets minimizing power consumption by a terminal and access of multiple terminals. The URLLC may be a service that targets high-reliability and low-latency. Different requirements may be applied depending on the type of service applied to a terminal.

Among the services described above, since the URLLC service aims for high reliability and low latency, it is necessary to transmit control information and data information through a physical channel at a low coding rate. A function of repetition transmission of control information has already been introduced in MTC and the narrow band Internet-of-Things (NB-IoT) service of LTE. The objective of repetition transmission is to provide high coverage for terminals having a small bandwidth, but the delay time is not sufficiently considered. In addition, the minimum unit for repetition transmission of control information is fixed in units of subframes based on LTE.

In order to support the URLLC service in an NR or 5G system, it is necessary to introduce a control information repetition transmission mode that can improve reliability while requiring a small delay time. Accordingly, the disclosure considers a situation in which control information is repeatedly transmitted within a slot. Further, the disclosure also considers a situation in which control information that can be transmitted across a slot boundary is repeatedly transmitted. Based on a method provided in the disclosure, a terminal can detect control information transmitted from a base station at a faster time with high reliability.

The terms that will be used below are terms defined in consideration of the functions in the disclosure, and may differ according to users, intentions of the users, or customs. Therefore, the definitions of the terms should be made based on the contents throughout the specification. Hereinafter, the base station is a subject for allocating resources to a terminal, and may be at least one of a gNode B (gNB), an eNode B (eNB), a Node B, a base station (BS), a radio access unit, a base station controller, or a node on a network. The controller may include a circuit, an application-specific integrated circuit, or at least one processor of a general purpose computer, special purpose computer, or programmable data processing equipment. The terminal may include a user equipment (UE), a mobile station (MS), a cellular phone, a smart phone, a computer, or a multimedia system capable of performing a communication function. In the disclosure, downlink (DL) refers to a radio transmission path of a signal transmitted to a terminal by a base station, and uplink (UL) refers to a radio transmission path of a signal transmitted to a base station by a terminal. In addition, the disclosure is described below using an NR system as an example, but is not limited thereto. Embodiments may be applied to various communication systems having a similar technical background or a similar channel form. In addition, embodiments may be modified without departing from the scope of the disclosure, and may be applied to other communication systems based on a determination by those skilled in the art.

In the disclosure, the terms "physical channel" and "signal" in a prior art may be used interchangeably with "data" or "control signal". For example, a physical down link shared channel (PDSCH) is a physical channel through which data is transmitted, but in the disclosure, the PDSCH may be referred to as data.

In the disclosure, a higher signal or higher layer signaling is a signal transfer method in which a signal is transferred to a terminal from a base station by using a downlink data channel of a physical layer, or a signal is transferred to a base station from a terminal by using an uplink data channel of a physical layer. The method may include at least one of signal transfer methods via radio resource control (RRC) signaling, packet data convergence protocol (PDCP) signaling, or a medium access control (MAC) control element (CE).

Recently, as studies on a next generation communication system are conducted, various methods for scheduling communication with a terminal are discussed. Accordingly, a method for efficient scheduling and data transmission or reception in consideration of the characteristics of the next generation communication system is required. Therefore, in order to provide a user with multiple services in a communication system, a method for providing the respective services in the same time interval according to the characteristics thereof, and an apparatus using the same method are required.

A terminal is required to receive separate control information from a base station so as to transmit or receive data to or from the base station. However, in a case of periodically generated traffic or the type of service requiring low latency and/or high reliability, it may be possible to transmit or receive data without the separate control information. This transmission scheme is called a configured grant (CG or grant-free)-based data transmission method in the disclosure. A method for receiving or transmitting data after reception of data transmission resource configuration and relevant information configured through control information is called a first signal transmission/reception type. A method for transmitting or receiving data based on previously configured information without control information is called a second signal transmission/reception type.

For data transmission or reception of the second signal transmission/reception type, a preconfigured resource region may periodically exist. These regions may be preconfigured by a UL type 1 grant, which is a method configured using only a higher signal, and a UL type 2 grant (or SPS), which is a method configured using a combination of a higher signal and a layer 1 (L1) signal (i.e., downlink control information (DCI)). In a case of the UL type 2 grant (or SPS), a part of information is transmitted through a higher signal, and whether data is actually transmitted is determined based on an L1 signal. The L1 signal may be largely classified into a signal indicating activation of resources configured through a higher signal and a signaling indicating release of the activated resources.

FIG. 1 illustrates a transmission structure of a time-frequency domain, which is a radio resource domain of a 5G or NR system according to an embodiment of the disclosure.

Referring to FIG. 1, the horizontal axis in a radio resource domain represents a time domain, and the vertical axis thereof represents a frequency domain. The minimum transmission unit in the time domain is an OFDM symbol. $N_{symb}$ OFDM symbols 102 configure one slot 106. The length of the subframe is defined as 1 ms, and a radio frame 114 is defined as 10 ms. The minimum transmission unit in the frequency domain is a subcarrier, and the entire system transmission bandwidth includes a total of $N_{BW}$ subcarriers 104. However, these specific numerical values may be variably applied depending on the system.

The basic unit in the time-frequency domain is a resource element (RE) 112, which may be indicated through an OFDM symbol index and a subcarrier index. A resource block (RB) 108 may be defined by consecutive $N_{RB}$ subcarriers 110 in the frequency domain.

In general, the minimum transmission unit of data is the RB unit. The 5G or NR system generally shows $N_{symb}$=14 and $N_{RB}$=12, and New may be proportional to the bandwidth of a system transmission band. The data rate may increase in proportion to the number of RBs scheduled to the terminal. In a 5G or NR system, in a case of a frequency division duplex (FDD) system in which downlink and uplink are operated at separate frequencies, the downlink transmission bandwidth and the uplink transmission bandwidth may be different from each other. The channel bandwidth indicates a radio frequency (RF) bandwidth corresponding to the system transmission bandwidth. Table 1 below shows a correlation between a system transmission bandwidth and a channel bandwidth defined in an LTE system, which is a 4-th generation wireless communication system before a 5G or NR system. For example, an LTE system having a 100 MHz channel bandwidth may be configured by 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration NRB | 6 | 15 | 25 | 50 | 75 | 100 |

A 5G or NR system may employ a wider channel bandwidth than the channel bandwidths of LTE suggested in Table 1. Table 2 shows the correlation between a system transmission bandwidth, a channel bandwidth, and subcarrier spacing (SCS) in a 5G or NR system.

TABLE 2

| | | Channel bandwidth $BW_{Channel}$ [MHz] | | | | | | | | | |
|---|---|---|---|---|---|---|---|---|---|---|---|
| | SCS [kHz] | 5 | 10 | 15 | 20 | 25 | 40 | 50 | 60 | 80 | 100 |
| Maximum Transmission bandwidth $N_{RB}$ | 15 | 25 | 52 | 79 | 106 | 133 | 216 | 270 | N.A. | N.A. | N.A. |
| | 30 | 11 | 24 | 38 | 51 | 65 | 106 | 133 | 162 | 217 | 273 |
| | 60 | N.A. | 11 | 18 | 24 | 31 | 51 | 65 | 79 | 107 | 135 |

In a 5G or NR system, scheduling information of downlink data or uplink data is transmitted from a base station to a terminal through downlink control information (DCI). DCI is defined according to various formats, and a terminal may determine, according to each format, whether the DCI is scheduling information (UL grant) of uplink data or scheduling information (DL grant) of downlink data, whether the control information is compact DCI, which has a small size, whether spatial multiplexing using multiple antennas is applied, whether the DCI is used for power control, and the like. For example, DCI format 1_1, which includes scheduling information (DL grant) of downlink data, may include at least one of the pieces of control information described below.

Carrier indicator: indicating a frequency carrier via which data scheduled by DCI is transmitted.

DCI format indicator: distinguishing whether corresponding DCI is used for a downlink or uplink.

Bandwidth part (hereinafter, BWP) indicator: indicating a BWP in which transmission of DCI is performed.

Frequency domain resource allocation: indicating an RB in the frequency domain, this is allocated for data transmission. A resource is determined according to a system bandwidth and a resource allocation method.

Time domain resource allocation: indicating a slot and an OFDM symbol of the slot, on which a data-related channel is to be transmitted.

Virtual resource block (VRB)-to-physical resource block (PRB) mapping: indicating a method by which a virtual RB (hereinafter, VRB) index and a physical RB (hereinafter, PRB) index are to be mapped.

Modulation and coding scheme (hereinafter, MCS): indicating a modulation scheme and a coding rate which are used for data transmission. That is, the modulation and coding scheme may indicate a coding rate value capable of notifying of channel coding information and a transport block size (TBS) together with information relating to whether the modulation scheme corresponds to quadrature phase shift keying (QPSK), 16 quadrature amplitude modulation (QAM), 64 QAM, or 256 QAM.

Codeblock group (CBG) transmission information: in case that CBG retransmission is configured, indicating information of a CBG to be transmitted.

HARQ process number: indicating a process number of an HARQ.

New data indicator: indicating whether the transmission is an HARQ initial transmission or retransmission.

Redundancy version: indicating a redundancy version of an HARQ.

Physical uplink control channel (PUCCH) resource indicator: indicating a PUCCH resource through which ACK/NACK information for downlink data is transmitted.

PDSCH-to-HARQ feedback timing indicator: indicating a slot on which ACK/NACK information for downlink data is transmitted.

Transmit power control (TPC) command for PUCCH: indicating a transmit power control command for a PUCCH, which is an uplink control channel.

In relation to PUSCH transmission, the time domain resource assignment may be indicated through information of a slot on which the PUSCH is transmitted, "S" indicating the position of the starting OFDM symbol of the slot, and "L" indicating the number of OFDM symbols to which the PUSCH is mapped. "S" may indicate a relative position from the start of the slot, "L" may indicate the number of consecutive OFDM symbols, and "S" and "L" may be determined from a start and length indicator value (SLIV) defined as below.

If $(L-1) \leq 7$ then
$\quad$ SLIV=14*(L-1) +S
else
$\quad$ SLIV=14*(14-L+1) ± (14-1-S)
where $0 < L \leq 14-S$ Generally, in a 5G or NR system, a terminal or base station may receive configuration of a table in which an SLIV value, a PUSCH mapping type, and information of a slot on which the PUSCH is transmitted are included in one row, through RRC configuration. Thereafter, by indicating an index value in the table in which the time domain resource assignment of DCI is configured, a base station may transmit, to a terminal, an SLIV value, a PUSCH mapping type, and information of a slot on which the PUSCH is transmitted. This method is also applied to a PDSCH.

Specifically, if a base station transmits, to a terminal, index m, which is the index of a time resource allocation field included in DCI scheduling of a PDSCH, the time resource allocation field index m indicates a combination of DMRS type A position information, PDSCH mapping type information, slot index K0, data resource starting symbol S, and data resource assignment length L, which correspond to m+1 based on a table representing time domain resource assignment information. For example, Table 3 below is a table including pieces of normal cyclic prefix-based PDSCH time domain resource assignment information.

TABLE 3

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In Table 3, the dmrs-typeA-Position is a field indicating the position of a symbol transmitting a DMRS in one slot indicated through a system information block (SIB), which is one of pieces of terminal-common control information. An available value of the field is 2 or 3. If the number of symbols configuring one slot is a total of 14 and the first symbol index is 0, 2 denotes the third symbol, and 3 denotes the fourth symbol.

In Table 3, the PDSCH mapping type is information notifying of the position of a DMRS in a scheduled data resource region. If the PDSCH mapping type is A, a DMRS is always transmitted or received at a symbol position determined by the dmrs-typeA-Position regardless of an assigned data time domain resource. If the PDSCH mapping type is B, a DMRS is always transmitted or received at the first symbol in an assigned data time domain resource. For example, a PDSCH mapping type B does not use dmrs-typeA-Position information.

In Table 3, $K_0$ denotes the offset between the index of a slot to which a PDCCH transmitting DCI belongs and the index of a slot to which a PDSCH or PUSCH scheduled by the DCI belongs. For example, if the slot index of a PDCCH is n, the slot index of a PDSCH or PUSCH scheduled by DCI of the PDCCH is n+$K_0$. In Table 3, S denotes the index of the starting symbol of a data time domain resource in one slot. The range of an available S value is 0 to 13 based on a normal cyclic prefix. In Table 3, L is the length of a data time domain resource period in one slot. The range of an available L value is 1 to 14.

In a 5G or NR system, a PUSCH mapping type is defined to be type A or type B. In PUSCH mapping type A, the first OFDM symbol among DMRS OFDM symbols is positioned at the second or third OFDM symbol in a slot. In a PUSCH mapping type B, the first OFDM symbol among DMRS OFDM symbols is positioned at the first OFDM symbol of a time domain resource assigned for PUSCH transmission. The PUSCH time domain resource assignment method can be identically applied to PDSCH time domain resource assignment.

DCI is subject to channel coding and modulation processes and may be transmitted through a PDCCH (or control information, hereinafter, PDCCH may be interchangeably used with control information), which is a downlink physical control channel. Generally, DCI is scrambled by a particular radio network temporary identifier (a RNTI or a terminal identifier) independently for each terminal, and then a cyclic redundancy check (CRC) is added to the DCI. The DCI is channel-coded, and then is configured to be an independent PDCCH to be transmitted. A PDCCH is mapped to a control resource set (CORESET) configured for a terminal, and then is transmitted.

Downlink data may be transmitted through a PDSCH, which is a physical channel for downlink data transmission. A PDSCH may be transmitted after a control channel transmission period, and scheduling information relating to a specific mapping position in the frequency domain, a modulation scheme, and the like is determined based on DCI transmitted through a PDCCH.

Through MCS among pieces of control information configuring DCI, a base station notifies a terminal of a modulation scheme applied to a PDSCH to be transmitted, and the size (transport block size (TBS)) of data to be transmitted. In an embodiment, MCS may be configured by 5 bits or more or fewer bits. A TBS corresponds to the size of data (a transport block (TB)), which a base station is to transmit, before channel coding for error correction is applied to the data.

In the disclosure, a transport block (TB) may include a medium access control (MAC) header, a MAC CE, one or more MAC service data units (SDUs), and padding bits. In addition, a TB may indicate the unit of data downloaded from a MAC layer to a physical layer, or a MAC protocol data unit (PDU).

A modulation scheme supported by a 5G or NR system is quadrature phase shift keying (QPSK), 16 quadrature amplitude modulation (QAM), 64 QAM, and 256 QAM, and the modulation orders (Qm) thereof correspond to 2, 4, 6, and 8, respectively. That is, 2 bits per symbol may be transmitted in a case of QPSK modulation, 4 bits per OFDM symbol may be transmitted in a case of 16 QAM modulation, 6 bits per symbol may be transmitted in a case of 64 QAM modulation, and 8 bits per symbol may be transmitted in a case of 256 QAM modulation.

Figure 2:
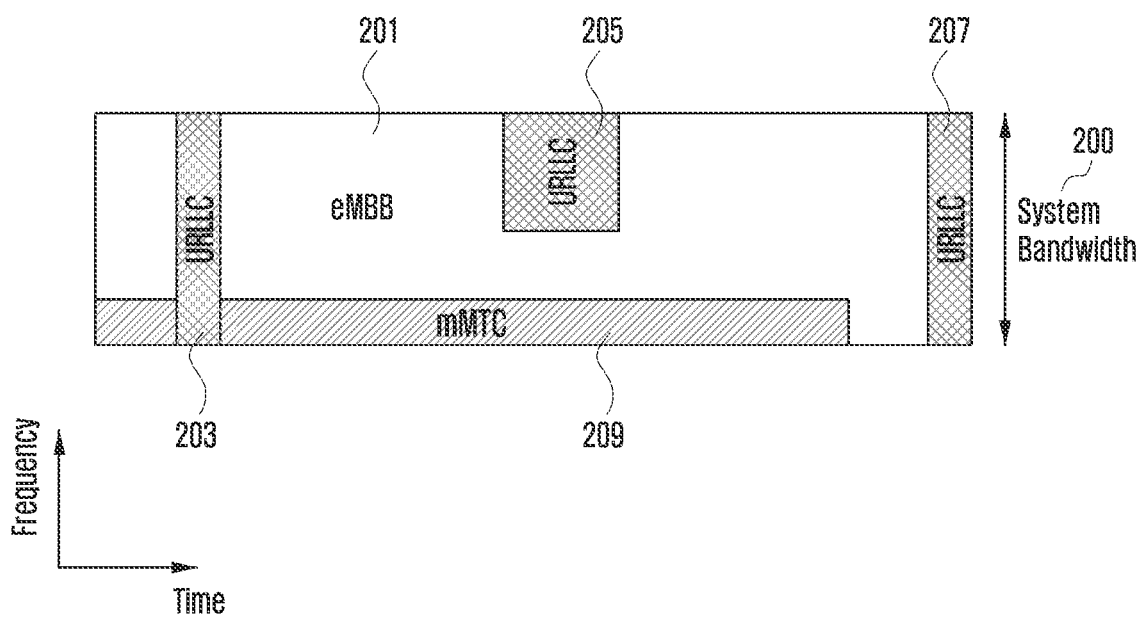
FIG. 2 illustrates a method in which pieces of data for enhanced mobile broadband (eMBB), ultra-reliable and low-latency communications (URLLC), and massive machine type communications (mMTC) are allocated in a frequency-time resource domain in a 5G or NR system according to an embodiment of the disclosure.

FIG. 2 illustrates a method for allocating pieces of data for eMBB, URLLC, and mMTC in a time-frequency resource domain in a 5G or NR system according to an embodiment of the disclosure.

Referring to FIG. 2, data for eMBB, URLLC, and mMTC may be allocated in the entire system frequency band 200. If, during a process where eMBB data 201 and mMTC data 209 are allocated and transmitted in a particular frequency band, pieces of URLLC data 203, 205, and 207 occur and are required to be transmitted, a transmitter may empty frequency bandwidths to which the eMBB data 201 and mMTC data 209 have already been assigned, or may not transmit the eMBB data and mMTC data to transmit the URLLC data 203, 205, and 207. Among the above services, URLLC is a service required to reduce a latency time, and thus URLLC data 203, 205, and 207 may be assigned to a part of a resource to which eMBB data 201 or mMTC data 209 is allocated, and then may be transmitted. In case that URLLC data is additionally assigned to a resource to which eMBB data 201 is assigned and then transmitted, the eMBB data may not be transmitted through an overlapping time-frequency resource, and thus the transmission performance of eMBB data may be degraded. That is, an eMBB data transmission failure may occur due to URLLC assignment.

Figure 3:
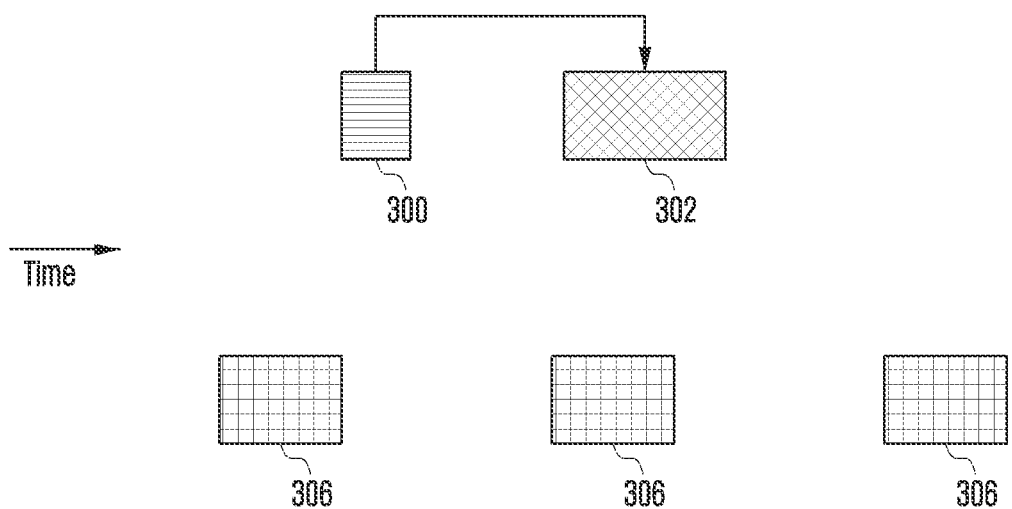
FIG. 3 illustrates a method for PUSCH transmission according to an embodiment of the disclosure.

FIG. 3 illustrates a PUSCH transmission method according to an embodiment of the disclosure.

In a 5G or NR system, a terminal transmits data information to a base station through a physical uplink shared channel (PUSCH). FIG. 3 shows an embodiment of a process in which a terminal performs transmission through a PUSCH.

Referring to FIG. 3, the terminal receives DCI through a PDCCH 300 and receives scheduling of a PUSCH resource 302 through the DCI. Specifically, a part of information that can be indicated through DCI is configured through a higher signal, and one DCI can be selected from among pieces of information received/configured through the higher signal. DCI may be replaced with L1 signal and used in the disclosure. The higher signal may collectively refer to all signals above L1.

Alternatively, a periodic PUSCH resource 306 may be always configured through a higher signal without reception of DCI. This is called a configured grant (CG) PUSCH. The terminal may transmit data information or control information through the PUSCH resource. The control information may include HARQ-ACK, scheduling request (SR), channel state information (CSI), and the like. In an unlicensed band, at the time of transmission of the CG PUSCH, the HARQ process number, redundancy version (RV), new data indicator (NDI), channel occupancy time (COT) sharing information, and the like of the corresponding PUSCH are piggybacked, as configured grant (CG)-uplink control information (UCI), on the corresponding CG PUSCH transmission resource, and transmitted. The CG PUSCH resource 306 may be a resource individually used for transmission or a resource used for repetition transmission. In a case of a resource individually used for transmission, transport blocks (TBs) transmitted through the CG PUSCH are all different, and in a case of a resource repeatedly used for transmission, TBs transmitted through the CG PUSCH are all the same.

Figure 4:
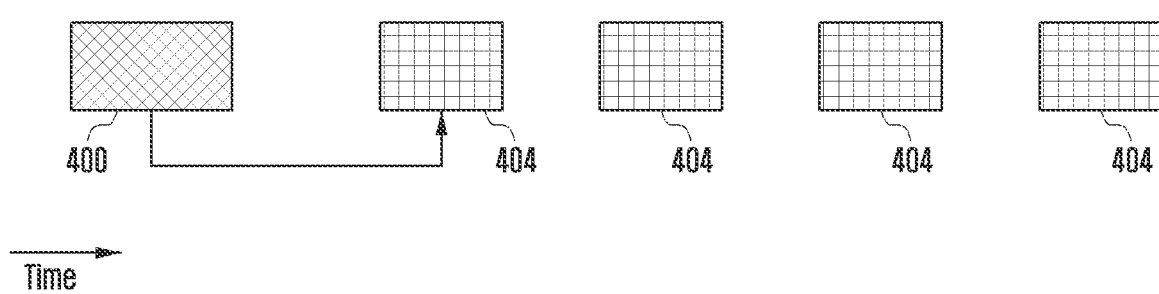
FIG. 4 illustrates a method for PUSCH repetition transmission according to an embodiment of the disclosure.

FIG. 4 illustrates a method for PUSCH repetition transmission according to an embodiment of the disclosure.

In general, since the transmission power of a terminal is lower than that of the base station, the uplink coverage may be smaller than the downlink coverage. In order to solve this problem, a repetition transmission technique may be considered from a viewpoint of time domain. In case that repetition transmission is performed, since more energy can be received from the standpoint of a receiver, demodulation/decoding performance may be further improved.

Referring to FIG. 4, it illustrates an example of a situation in which a PUSCH 404 is scheduled using DCI information transmitted through a PDCCH 400. The PUSCH 404 is repeatedly transmitted 4 times, and PUSCH repetition transmission may be repeated based on the same starting point and the same length in units of slots. The number of repeated transmissions may be determined by a higher signal or an L1 signal. Alternatively, it may be possible to periodically transmit or receive a PUSCH 404 without the PDCCH 400, and in this case, the number of repeated transmissions may be determined by the L1 signal or a higher signal activating the corresponding CG PUSCH.

Hereinafter, a method for time domain resource allocation for a data channel in a 5G communication system will be described.

A base station may configure, for a terminal, a table for time domain resource allocation information for a downlink data channel (physical downlink shared channel; PDSCH) and an uplink data channel (physical uplink shared channel; PUSCH) through higher layer signaling (e.g., RRC signaling).

The base station may configure a table including at most maxNrofDL-Allocations (=16) entries for the PDSCH, and may configure a table including at most maxNrofUL-Allocations (=16) entries for the PUSCH. The time domain resource allocation information may include, for example, PDCCH-to-PDSCH slot timing (corresponding to a time interval in slot units between a time point at which the PDCCH is received and a time point at which the received scheduled PDSCH is transmitted, notated with K0), PDCCH-to-PUSCH slot timing (corresponding to a time interval in slot units between a time point at which the PDCCH is received and a time point at which the received scheduled PUSCH is transmitted, notated with K2), information relating to the position and the length of the start symbol for which the PDSCH or PUSCH is scheduled in the slot, the type of mapping PDSCH or PUSCH, and the like. For example, information such as at least one of Table 4 to Table 6 may be notified of from the base station to the terminal.

TABLE 4

PDSCH-TimeDomainResourceAllocationList information element

PDSCH-TimeDomainResourceAllocationList ::= SEQUENCE (SIZE(1..maxNrofDL-Allocations))
OF PDSCH-TimeDomainResourceAllocation
PDSCH-TimeDomainResourceAllocation ::= SEQUENCE {
  k0                           INTEGER(0..32)             OPTIONAL,  -- Need S
  (PDCCH-to-PDSCH timing, slot units)
  mapping Type         ENUMERATED {typeA, typeB},
  (PDSCH mapping type)

TABLE 4-continued

PDSCH-TimeDomainResourceAllocationList information element

```
startSymbolAndLength          INTEGER (0..127)
(start symbol and length of PDSCH)
}
```

TABLE 5

PUSCH-TimeDomainResourceAllocation information element

```
PUSCH-TimeDomainResourceAllocationList ::=  SEQUENCE (SIZE(1..maxNrofUL-Allocations))
OF PUSCH-TimeDomainResourceAllocation
PUSCH-TimeDomainResourceAllocation ::=    SEQUENCE {
    k2                  INTEGER(0..32)     OPTIONAL,  -- Need S
    (PDCCH-to-PUSCH timing, slot units)
    mapping Type              ENUMERATED {typeA, typeB},
    (PUSCH mapping type)
    startSymbolAndLength          INTEGER (0..127)
    (start symbol and length of PUSCH)
}
```

TABLE 6

PUSCH-TimeDomainResourceAllocationNew information element

```
PUSCH-TimeDomainResourceAllocationListNew-r16 ::= SEQUENCE
(SIZE(1..maxNrofUL-Allocations-r16)) OF PUSCH-TimeDomainResourceAllocationNew-
r16
PUSCH-TimeDomainResourceAllocationNew-r16 ::= SEQUENCE {
    k2-r16                  INTEGER (0..32)           OPTIONAL,  --
Need S
    (PDCCH-to-PUSCH timing, slot units)
    mappingType-r16             ENUMERATED {typeA, typeB}
OPTIONAL,  -- Cond RepTypeA
    (limited to PUSCH mapping type, repetition transmission type A)
    startSymbolAndLength-r16        INTEGER (0..127)
OPTIONAL,  -- Cond RepTypeA
    (start symbol and length of PUSCH, and limited to repetition transmission type A)
    startSymbol-r16             INTEGER (0..13)          OPTIONAL,  --
Cond RepTypeB
    (start symbol of PUSCH, and limited to repetition transmission type B)
    length-r16              INTEGER (1..14)          OPTIONAL,  --
Cond RepTypeB
    (length of PUSCH, and limited to repetition transmission type B)
    numberOfRepetitions-r16         ENUMERATED {n1, n2, n4, n7, n12, n16},
    (number of repeated transmission of PUSCH)
    ...
}
```

The base station may notify the terminal of one of entries in the table for the time domain resource allocation information through L1 signaling (e.g., DCI) (e.g., may be indicated through "time domain resource allocation" field in DCI). The terminal may acquire time domain resource allocation information for the PDSCH or PUSCH based on the DCI received from the base station. The bit size of the DCI field is determined by the number of entries configured in Table 4 to Table 6. For example, in case that a total of 4 entries are configured as a higher signal for total PUSCH scheduling, the "time domain resource allocation" field in DCI may be determined to be 2 bits.

Hereinafter, repetition transmission of an uplink data channel (physical uplink shared channel; PUSCH) in a 5G system will be described in detail.

In 5G, as a method for repeatedly transmitting an uplink data channel, two types are supported: A PUSCH repetition transmission type A and a PUSCH repetition transmission type B. A PUSCH repetition transmission type A and a PUSCH repetition transmission type B may be configured through a higher signal for each scheduling DCI format.

1. PUSCH Repetition Transmission Type A

The start symbol and length of the uplink data channel are determined through the time domain resource allocation method, and a base station notifies a terminal of the number of repeated transmissions to the terminal through higher layer signaling (e.g., RRC signaling) or L1 signaling (e.g., DCI).

The terminal performs, in consecutive slots, repeated transmission of an uplink data channel having the same start symbol and length as that of the configured uplink data channel, based on the number of repeated transmissions received from the base station. That is, the PUSCH having the same start symbol and the same symbol length is repeatedly transmitted or received in slot units as many times as the number of repeated slot transmissions, provided by the higher signal or L1 signal. A slot (Ks) transmitted or received through the first repetition transmission PUSCH is determined by $$Ks = \left\lfloor n \cdot \frac{2^{\mu_{PUSCH}}}{2^{\mu_{PDCCH}}} \right\rfloor + K_2.$$

n denotes a slot index at which the scheduling DCI is transmitted or received, and $K_2$ denotes an offset value between the scheduling DCI and the PUSCH based on a subcarrier spacing through which the PUSCH is transmitted or received. $\mu_{PUSCH}$ and $\mu_{PDCCH}$ denote subcarrier spacing values between PUSCH and PDCCH, and the subcarrier spacing is defined as $15 \cdot 2^\mu$ kilohertz (kHz).

Here, in case that the base station configures, in connection with the terminal, a slot in a downlink or at least one of configured uplink data channel symbols is configured for downlink, the terminal omits uplink data channel transmission. That is, although it is included in the number of repeated transmissions of the uplink data channel, uplink data transmission does not occur.

If the number of repeated transmissions is called K, allocation of the same symbol is applied to K consecutive slots in PUSCH repetition transmission type A, and the PUSCH has a single transmission layer. The terminal needs to repeatedly transmit the same TB to K consecutive slots for which the same symbols are applied for respective slots. Table 7 below may be used for the RV value for the n-th repeated transmission. Table 7 is applicable to both repetition transmission type A and repetition transmission type B.

TABLE 7

| $rv_{id}$ indicated by the DCI scheduling the PUSCH | $rv_{id}$ to be applied to $n^{th}$ transmission occasion. (repetition Type A) or $n^{th}$ actual repetition (repetition Type B) | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

2. PUSCH Repetition Transmission Type B

In one slot, the start symbol and the length of the uplink data channel are determined according to the time domain resource allocation method, and the base station may notify the terminal of the number of repeated transmissions numberofrepetitions through higher signaling (e.g., RRC signaling) or L1 signaling (e.g., DCI).

Based on the start symbol and length of the uplink data channel, the configuration of which is received by the terminal from the base station, nominal repetition of the uplink data channel is determined as follows. A slot in which the nth nominal repetition starts is determined by $$K_s + \left\lfloor \frac{S + n \cdot L}{N_{symb}^{slot}} \right\rfloor,$$

and a starting symbol in the slot is determined by mod(S+ n·L, $N_{symb}^{slot}$). A slot in which the nth nominal repetition ends is determined by $$K_s + \left\lfloor \frac{S + (n+1) \cdot L - 1}{N_{symb}^{slot}} \right\rfloor,$$

and an ending symbol in the slot is determined by mod(S+ (n+1)·L−1, $N_{symb}^{slot}$) symb Here, n=0, . . . , numberofrepetitions−1, S denotes a start symbol of a configured uplink data channel, and L denotes a symbol length of a configured uplink data channel. $K_s$ denotes a slot in which PUSCH transmission starts and $N_{symb}^{slot}$ denotes the number of symbols per slot.

The terminal may determine an invalid symbol for PUSCH repetition transmission type B. A symbol configured for downlink by tdd-UL-DL-ConfigurationCommon or tdd-UL-DL-ConfigurationDedicated may be considered as an invalid symbol for PUSCH repetition transmission type B. Further, a symbol indicated by ssb-PositionsInBurst may be considered as an invalid symbol. The ssb-PositionsInBurst corresponds to information indicating a position where PSS/SSS/PBCH is transmitted or received in SIB1 or SS/PBCH block in an unpaired spectrum. In addition, in the unpaired spectrum, a symbol indicated as a PDCCH region for reception of SIB1 indicated in MIB, for CORESET for Type0-PDCCH CSS, may be considered an invalid symbol. If a numberInvalidSymbolsForDL-UL-Switching higher signal is configured in the unpaired spectrum, symbols, which are indicated through the numberInvalidSymbolsForDL-UL-Switching higher signal after the last symbol within all consecutive symbol sets configured by downlink symbols indicated through tdd-UL-DL-ConfigurationCommon or tdd-UL-DL-ConfigurationDedicated indicating time division duplex (TDD) configuration information, may be considered invalid symbols. Here, the reference subcarrier spacing of a symbol indicated through a numberInvalidSymbolsForDL-UL-Switching higher signal is determined based on a referenceSubcarrierSpacing higher signal within the tdd-UL-DL-ConfigurationCommon. Further, an invalid symbol may be configured through a higher layer parameter (e.g., InvalidSymbolPattern). The higher layer parameter (e.g., InvalidSymbolPattern) may configure the invalid symbol by providing a symbol-level bitmap configured across one or two slots. For example, in a bitmap, a value of 1 may indicate an invalid symbol. Additionally, the period and pattern of the bitmap may be configured through a higher layer parameter (e.g., periodicityAndPattern). If a higher layer parameter (e.g., InvalidSymbolPattern) is configured and InvalidSymbolPatternIndicator-ForDCIFormat0_1 or InvalidSymbolPatternIndicator-ForDCIFormat0_2 parameter indicates 1, the terminal applies an invalid symbol pattern, and the value of 0 may indicate that the invalid symbol pattern is not applied. If a higher layer parameter (e.g., InvalidSymbolPattern) is configured and the InvalidSymbolPatternIndicator-ForDCIFormat0_1 or InvalidSymbolPatternIndicator-ForDCIFormat0_2 parameter is not configured, the terminal may apply an invalid symbol pattern.

The invalid symbol is determined in each nominal repetition, and then the terminal may consider the remaining symbols as valid symbols. If one or more valid symbols are included in each nominal repetition, the nominal repetition may include one or more actual PUSCH repetitions. Each actual PUSCH repetition may include a consecutive set of valid symbols that can be used for PUSCH repetition type B in one slot. Except for the case where L=1, the actual PUSCH repetition configured based on 1 symbol may be omitted, and in this case, the terminal does not transmit the corresponding actual PUSCH.

Figure 5:
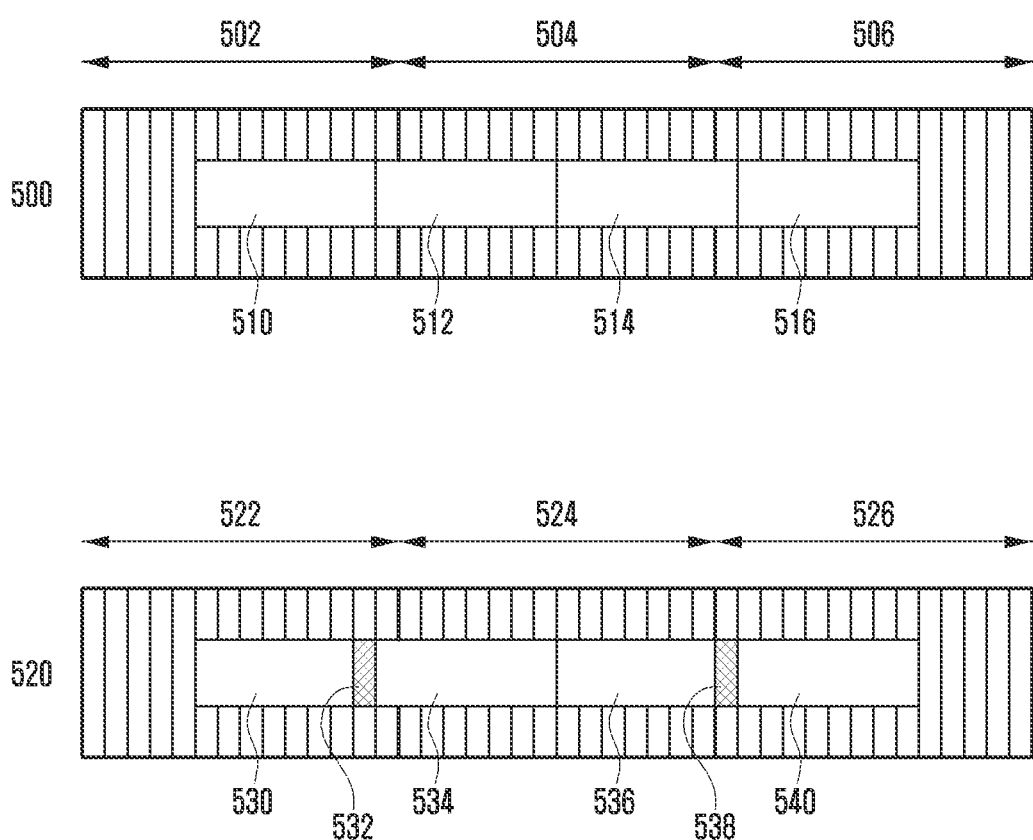
FIG. 5 illustrates an example of a PUSCH repetition transmission type B according to an embodiment of the disclosure.

FIG. 5 illustrates an example of PUSCH repetition transmission type B according to an embodiment of the disclosure.

In PUSCH repetition transmission type B, the base station basically performs scheduling with nominal repetition through a higher signal and an L1 signal and then determines whether there is a slot boundary or an invalid symbol, so as to determine actual PUSCH repetition to be transmitted by the final terminal.

Referring to FIG. 5, reference numeral 500 corresponds to an example of nominal repetition, and reference numeral 520 corresponds to an example of actual PUSCH repetition actually transmitted by the terminal based on nominal repetition 500. numberofrepetitions is considered to be 4. "500" is an example of a repetition transmission type B format, and shows a case in which PUSCH, which starts from the 6th symbol of a slot 502 and has a length of 8 symbols over a total of 3 slots 502, 504, and 506, is repeated a total of 4 times. Nominal repetition is performed such that the first PUSCH 510 is scheduled and then PUSCHs 512, 514, and 516 are repeatedly scheduled, regardless of the slot boundary or the invalid symbol. The terminal determines an actual PUSCH repetition resource to be actually transmitted by the terminal based on scheduling information of the PUSCH repetition transmission type B as shown in 500. Further, if all symbols are valid symbols, the terminal transmits, based on the slot boundary as shown in 520 of FIG. 5, a PUSCH configured by a total of 6 actual PUSCH repetitions 530, 532, 534, 536, 538, and 540 over slots 522, 524, and 526.

However, as described above, since the terminal has not actually transmitted the PUSCH through the actual PUSCH repetition resource having a 1 symbol length in a situation other than L=1, the terminal does not transmit the PUSCH in PUSCH repetitions 532 and 538. Therefore, the terminal will transmit a PUSCH configured by a total of four actual PUSCH repetitions 530, 534, 536, and 540. Therefore, in case that the terminal is scheduled in the format of PUSCH repetition transmission type B, the terminal determines TBS based on an L value indicated through the scheduling DCI. The L value may be equal to or smaller than the PUSCH transmission length actually transmitted by the terminal.

If some symbols in FIG. 5 are invalid symbols, the terminal will transmit the PUSCH as an actual PUSCH repetition divided into two or more PUSCHs based on the corresponding invalid symbols.

Figure 6:
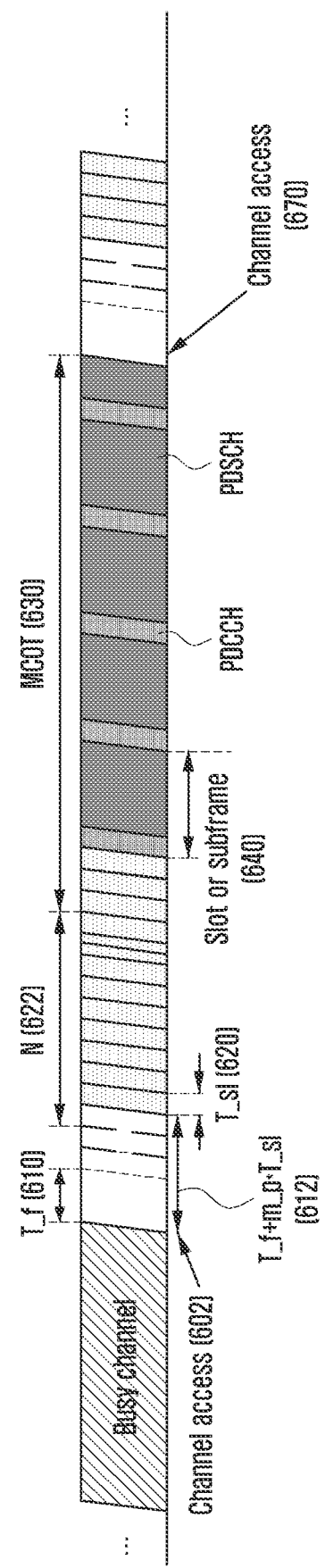
FIG. 6 illustrates an example of a channel access procedure in an unlicensed band in a wireless communication system according to an embodiment of the disclosure.

FIG. 6 illustrates an example of a channel access procedure in an unlicensed band in a wireless communication system according to an embodiment of the disclosure. There is a need for a situation in which the base station performs a channel access procedure in order to occupy the unlicensed band.

Referring to FIG. 6, a base station desiring to transmit a downlink signal using the unlicensed band may perform a channel access procedure for the unlicensed band for at least $T\_f+m\_p*T\_sl$ time (e.g., a defer duration 612 of FIG. 6). $T\_f$ is an initial defer duration value and may be used to identify whether a channel is in an idle state. Here, $T\_sl$ is channel access attempt duration, and $m\_p$ is the number of times channel access is possible. If the base station is to perform a channel access procedure with channel access priority class 3 (p=3), the size of $T\_f+m\_p*T\_sl$ may be configured using $m\_p=3$ with respect to the defer duration size of $T\_f+m\_p*T\_sl$ that is required to perform the channel access procedure. Here, $T\_f$ is a value fixed to 16 microsecond (μs) (e.g., duration 610 in FIG. 6), the initial time $T\_sl$ needs to be in an idle state, and the base station may not perform the channel access procedure at the remaining time ($T\_f-T\_sl$) after the $T\_sl$ time during the time $T\_f$. Here, even if the base station has performed the channel access procedure at the remaining time ($T\_f-T\_sl$), the channel access may not be performed. In other words, the time ($T\_f-T\_sl$) is the time in case that the base station defers performing of the channel access procedure.

If the unlicensed band is in the idle state for all the time $m\_p*T\_sl$, the value N may be N=N-1. In this case, N may be selected as a predetermined integer value among values between 0 and the contention window value $CW\_p$ at the time of performing the channel access procedure. In a case of channel access priority type 3, the minimum contention window value and the maximum contention window value are 15 and 63, respectively. If it is determined that the unlicensed band is in the idle state in the defer duration and an additional duration in case that the channel access procedure is performed, the base station may transmit a signal through the unlicensed band for the time $T\_mcot,p$ (8 ms). Meanwhile, Table 8 shows channel access priority class (or channel access priorities) in the downlink. In the disclosure, for convenience of description, embodiments are described based on the downlink channel access priority class. In a case of uplink, the same channel access priority class in Table 8 may be used in the same manner, or a separate channel access priority class for uplink signal transmission may be used.

TABLE 8

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The initial contention window value $CW\_p$ may be the minimum contention window value $CW\_min,p$. The base station having selected the value N may perform the channel access procedure in the duration $T\_sl$ (e.g., a slot duration 620 of FIG. 6), and in case that the unlicensed band is determined to be in the idle state through the channel access procedure having been performed in the duration $T\_sl$, the base station may change the value N to N=N-1. Further, in a case of N=0, a signal can be transmitted through the unlicensed band for the maximum time $T\_mcot,p$ (e.g., the maximum occupancy time 630 in FIG. 6). If the unlicensed band that is determined through the channel access procedure at time $T\_sl$ is not in an idle state, the base station may perform the channel access procedure again without changing the value N.

The size of the contention window value ($CW\_p$) may be changed or maintained according to downlink data that one or more terminals having received the downlink data transmitted through a downlink data channel in the reference subframe, reference slot, or reference transmit time interval (TTI) have transmitted or reported to the base station, that is, according to the ratio Z of the NACK among the reception results ACKs/NACKs for the downlink data having received in the reference subframe, reference slot, or reference transmit time interval (TTI). Here, the reference subframe, reference slot, or reference TTI may be determined based on one of: the first subframe, slot, or transmit time interval (TTI) of a downlink signal transmission interval (or maximum channel occupancy time (MCOT)) on which most recent transmission occurs by the base station through the unlicensed band at a time point at which a base station starts the channel access procedure, a time point at which the base station selects the value N to perform the channel access procedure, or immediately before the two time points; and a start subframe, a start slot, or a start transmission interval of the transmission interval.

Referring to FIG. 6, the base station may attempt channel access to occupy an unlicensed band. The first slot (or a slot in which channel occupancy time period is started), subframe, or transmission interval 640 of the downlink signal transmission interval (channel occupancy time, hereinafter may be used interchangeably with MCOT 630), most recently transmitted by the base station through the unlicensed band, at a time point 670 at which the base station starts the channel access procedure, a time point 622 at which the base station selects the value N in order to perform the channel access procedure, or immediately before the two time points, may be defined as the reference slot, the reference subframe, or the reference transmission interval. For convenience of description, it is hereinafter referred to as the reference slot. Specifically, one or more consecutive slots including the first slot, in which a signal is transmitted among all slots of the downlink signal transmission interval 630, may be defined as the reference slot. Further, according to an embodiment, if the downlink signal transmission interval starts after the first symbol of the slot, the slot in which the downlink signal transmission starts and the next slot of the slot may be defined as the reference slot. If, among the reception results for downlink data that one or more terminals having received the downlink data transmitted through a downlink data channel in the reference slot have transmitted or reported to the base station, the ratio of negative acknowledgment (NACK) has a value of Z or more, the base station may determine the contention window value or size being used in the channel access procedure 670 of the corresponding base station to be the contention window value or size that is next largest compared to the contention window value or size in the previous channel access procedure 602. In other words, the base station may increase the size of the contention window used in the channel access procedure 602. The base station may select a value N 622 from a range defined according to the increased-sized contention window, so as to perform the next channel access procedure 670.

If the base station is unable to acquire the reception result for the downlink data channel transmitted through the reference slot of the transmission interval 630, for example, if the time interval between the reference slot and a time point 670 at which the base station starts the channel access procedure is equal to or less than n slots or symbols (that is, if the base station starts the channel access procedure before the shortest time during which the terminal can report the reception result for the downlink data channel transmitted through the reference slot to the base station), the first slot of the downlink signal transmission interval for which the most recent transmission occurs before the downlink signal transmission interval 630 may become the reference slot.

In other words, if the base station is unable to receive, from the terminal, the reception result for the downlink data, having been transmitted through the reference slot 640 at a time point 670 at which the base station starts the channel access procedure, at a time point at which the base station selects the value N to perform the channel access procedure, or immediately before the time points, the base station may determine the contention window by using the downlink data reception result of the terminal with respect to the reference slot in the downlink signal transmission interval, for which the most recent transmission occurs, among the reception results for the downlink data channel previously received from the terminals. In addition, the base station may determine the contention window size that is used in the channel access procedure 670 by using the downlink data reception results received from the terminals with respect to the downlink data transmitted through the downlink data channel in the reference slot.

For example, if 80% or more of the reception results of the terminal for downlink data transmitted to the terminal through the downlink data channel in the reference slot among downlink signals transmitted through an unlicensed band are determined to be NACK, the base station, which has transmitted a downlink signal through a channel access procedure (e.g., CW_p=15) that is configured according to channel access priority type 3 (p=3), may increase the contention window value from the initial value (CW_p=15) to the next contention window value (CW_p=31). The ratio value of 80% is exemplary, and various modifications thereof are possible.

If 80% or more of the reception results of the terminal are not determined to be NACK, the base station may maintain the contention window value as the existing value, or may change the contention widow value to the initial value. In this case, the change of the contention window may be commonly applied to all of channel access priority types or may be applied only to the channel access priority types used in the channel access procedure. Here, a method for determining the value Z that is used for the determination of the change of the contention window size, among the reception results for the downlink data that the terminal has transmitted or reported to the base station with respect to the downlink data transmitted through the downlink data channel in the reference slot in which the change of the contention window size is determined is as follows.

If the base station transmits one or more codewords (CW) or TBs to one or more terminals in the reference slot, the base station may determine the value Z as the ratio of NACK among the reception results that the terminal has transmitted or reported with respect to the TB received in the reference slot. For example, if two codewords or two TBs are transmitted to one terminal in the reference slot, the base station may receive, from the terminal, the transmission or report of reception results of a downlink data signal for the two TBs. If the ratio Z of NACK of the two reception results is predefined or is equal to or greater than a threshold value (e.g., Z=80%) configured between the base station and the terminal, the base station may change or increase the contention window size.

Here, if the terminal transmits or reports, to the base station, the reception results for downlink data for one or more slots (e.g., M slots) including the reference slot through bundling, the base station may determine that the terminal has transmitted M reception results. Further, the base station may determine the value Z as the ratio of NACK among the M reception results, and may change, maintain, or initialize the contention window size.

If the reference slot corresponds to the second slot among two slots included in one subframe, or if a downlink signal is transmitted from the symbol after the first symbol in the reference slot, the reference slot and the next slot are determined to be the reference slot, and the value Z may be determined as the ratio of NACK among the reception results that the terminal has transmitted or reported to the base station with respect to downlink data received in the reference slot.

In addition, if scheduling information or downlink control information for a downlink data channel transmitted by the base station is transmitted from the same cell or frequency band as the cell or frequency band through which the downlink data channel is transmitted; if scheduling information or downlink control information for the downlink data channel transmitted by the base station is transmitted through an unlicensed band but is transmitted from a cell or frequency that is different from the cell or frequency through which the downlink data is transmitted; if it is determined that the terminal has not transmitted the reception result for the downlink data received in the reference slot; or if it is determined that the reception result for downlink data transmitted by the terminal is at least one of discontinuous transmission (DTX), NACK/DTX, or any state, the base station may determine the value Z by determining the reception result of the terminal to be NACK.

In addition, in a case where the scheduling information or downlink control information for the downlink data channel transmitted by the base station is transmitted through the licensed band, if the reception result for the downlink data transmitted by the terminal is determined to be one of DTX and NACK/DTX, the base station may not reflect the reception result of the terminal in the reference value Z of the contention window variation. In other words, the base station may determine the value Z by disregarding the reception result of the terminal.

In addition, in a case where the base station transmits scheduling information or downlink control information for a downlink data channel through a licensed band, if the base station has no actual downlink data transmission among the reception results for downlink data for the reference slot that the terminal has transmitted or reported to the base station, the base station may determine the value Z by disregarding the reception result for downlink data that the terminal has transmitted or reported.

The channel access procedure in the unlicensed band may be classified depending on whether the start time of the channel access procedure of the communication device is fixed (frame-based equipment (FBE)) or is variable (load-based equipment (LBE)). In addition to the start time of the channel access procedure, the communication device may be determined as an FBE device or an LBE device depending on whether the transmit/receive structure of the communication device has one period or does not have one period. Here, the fact that the start time of the channel access procedure has been fixed denotes that the channel access procedure of the communication device may start periodically according to a predefined period or a period declared or configured by the communication device. As another example, the fact that the start time of the channel access procedure has been fixed may denote that the transmission or reception structure of the communication device has one period. Here, the fact that the start time of the channel access procedure is variable may denote that the channel access procedure of the communication device can start at any time in case that the communication device intends to transmit the signal through the unlicensed band. As still another example, the fact that the start time of the channel access procedure is variable may denote that the transmission/reception structure of the communication device does not have one period, but it may be determined as needed.

The channel access procedure in the unlicensed band may include a procedure of determining an idle state of the unlicensed band by measuring the strength of the signal being received through the unlicensed band for a fixed period time or a time calculated according to a predefined rule (e.g., a time calculated through one random value selected by at least the base station or the terminal), and comparing the measured signal strength with a predefined threshold value or a threshold value that is calculated by a function of determining the size of the received signal strength according to at least one variable among a channel bandwidth, a signal bandwidth in which a signal intended to be transmitted is transmitted, and/or a transmission power strength.

For example, the communication device may measure the strength of a received signal for X μs (e.g., 25 μs) that is configured immediately before the time point at which the signal is to be transmitted, and if the measured signal strength is lower than a predefined or calculated threshold value T (e.g., −72 dBm), the communication device may determine that the unlicensed band is in an idle state, and may transmit a configured signal. In this case, the maximum time in case that successive signal transmission is possible after the channel access procedure may be limited depending on the maximum channel occupancy time (MCOT) defined for each country, area, or frequency band according to each unlicensed band. Further, the maximum time may also be limited depending on the type of communication device (e.g., base station or terminal, or master device or slave device). For example, in a case of Japan, in the 5 GHz unlicensed band, a base station or a terminal may transmit a signal by occupying a channel with respect to an unlicensed band that is determined to be in an idle state after performing the channel access procedure without performing an additional channel access procedure for the maximum time of 4 ms.

More specifically, in a case where the base station or the terminal intends to transmit a downlink or uplink signal using the unlicensed band, the channel access procedure that can be performed by the base station or the terminal may be classified as the following types.

Type 1: performing transmission of an uplink/downlink signal after performing a channel access procedure for a variable period of time Type 2: performing transmission of an uplink/downlink signal after performing a channel access procedure for a fixed period of time Type 3: performing transmission of transmission of an uplink/downlink signal without performing a channel access procedure A transmission device (e.g., base station or terminal) that intends to transmit a signal using an unlicensed band may determine a type of the channel access procedure according to a type of a signal for transmission. In the 3GPP, an LBT procedure, which is a channel access scheme, may be classified largely into four categories. The four categories may include a first category including a scheme that does not perform LBT, a second category including a scheme that performs LBT without random backoff, a third category including a scheme that performs LBT through random backoff in a fixed sized contention window, and a fourth category including a scheme that performs LBT through random backoff in a variable sized contention window. According to an embodiment, the third and fourth categories may be exemplified for type 1, the second category for type 2, and the first category for type 3. Here, type 2 or the second category that performs a channel access procedure for a fixed period of time may be classified into one or more types according to the fixed period of time for which the channel access procedure is performed. For example, type 2 may be classified into a type (type 2-1) for performing the channel access procedure for a fixed period of time A μs (e.g., 25 μs)

and a type (type 2-2) for performing the channel access procedure for a fixed period of time B μs (e.g., 16 μs).

In the disclosure, for convenience of explanation, the transmission device may be assumed to be the base station, and the transmission device and the base station may be interchangeably used.

For example, in a case where the base station intends to transmit a downlink signal including a downlink data channel using the unlicensed band, the base station may perform the type 1 channel access procedure. Further, in a case where the base station intends to transmit a downlink signal that does not include a downlink data using the unlicensed band, for example, in a case where the base station intends to transmit a synchronization signal or a downlink control channel, the base station may perform the type 2 channel access procedure, and may transmit a downlink signal.

Here, the type of the channel access procedure may be determined according to the transmission length of the signal intended to be transmitted using the unlicensed band, the period of time for occupying and using the unlicensed band, or the length of spacing. In general, in type 1, the channel access procedure may be performed for a longer time than the time in case that the channel access procedure is performed in type 2. Therefore, in a case where the communication device intends to transmit the signal for a short time duration or for a period of time that is equal to or shorter than a reference time (e.g., X ms or Y symbol), the type 2 channel access procedure may be performed. On the other hand, in a case where the communication device intends to transmit the signal for a long duration or for a period of time that is equal to or exceeds the reference time (e.g., X ms or Y symbol), the type 1 channel access procedure may be performed. In other words, according to the usage time of the unlicensed band, different types of channel access procedures may be performed.

If the transmission device performs the type 1 channel access procedure according to at least one of the above-described references, the transmission device, which intends to transmits a signal using the unlicensed band, may determine a channel access priority class (or channel access priority) according to a quality of service class identifier (QCI) of the signal intended to be transmitted using the unlicensed band, and may perform the channel access procedure using at least one of predefined configuration values as in Table 8 with respect to the determined channel access priority class. Table 8 below shows a mapping relationship between the channel access priority class and the QCI. Here, the mapping relationship between the channel access priority type and the QCI as shown in Table 8 is only an example, and is not limited thereto.

For example, QCI 1, 2, or 4 may denote a QCI value for a service, such as conversational voice, conversational video (live streaming), or non-conversational video (buffered streaming).

Hereinafter, the channel access procedure in a case where the start time of the channel access procedure of the communication device is fixed (frame-based equipment (FBE)) (hereinafter, frame-based channel access procedure or FBE-based channel access procedure) will be described using FIG. 7.

The unlicensed band is a frequency band that can be freely used by everybody without separate permission/approval. For example, although the corresponding frequency band differs by country, a frequency band of 5 GHz or 6 GHz is an unlicensed band in general. A licensed band is a frequency band that is licensed for a specific purpose and used by a business operator or a specific organization. For example, a frequency band of 3, 4 GHz or 28 GHz is a licensed band.

Figure 7:
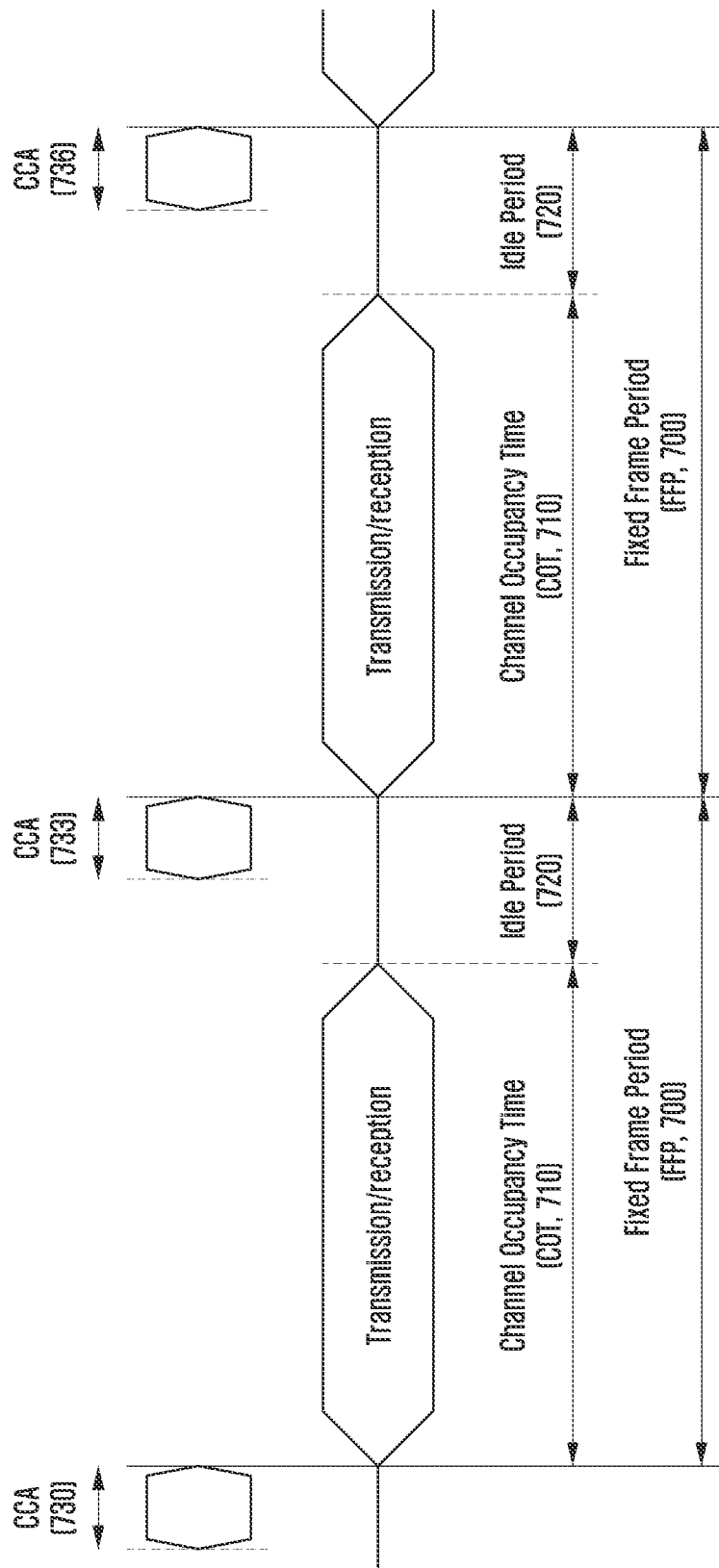
FIG. 7 illustrates another example of a channel access procedure in an unlicensed band in a wireless communication system according to an embodiment of the disclosure.

FIG. 7 illustrates another example of a channel access procedure in an unlicensed band in a wireless communication system according to an embodiment of the disclosure.

Referring to FIG. 7, a communication device that performs a frame-based channel access procedure may periodically transmit or receive signals according to a fixed frame period (FFP). Here, a fixed frame period 700 may be declared or configured by the communication device (e.g., base station), and may be configured, for example, in the range of 1 ms to 10 ms. In this case, the channel access procedure for the unlicensed band (or clear channel access (CCA)) may be performed at 730, 733, and 736 immediately before the start of each of frame periods in the type 2 channel access procedure as described above, and the channel access procedure may be performed for a fixed time or one observation slot. If it is determined that the unlicensed band is in an idle state or is an idle channel as a result of the channel access procedure, the communication device may transmit or receive signals without performing a separate channel access procedure for at most 95% of the time of the fixed frame period 700 (hereinafter, channel occupancy time (COT) 710). Here, no signal is transmitted or received during an idle period of time 720 for at least 5% of the fixed frame period 700, and the channel connection procedures can be performed within idle period of time 720.

The frame-based channel access procedure can be relatively simpler than a traffic-based channel access procedure, and can periodically perform the channel access of the unlicensed band. However, the start time of the channel access procedure is fixed, and thus the probability of the unlicensed band being accessible in comparison with the traffic-based channel access procedure may be decreased.

A terminal configured or indicated to transmit an uplink signal or channel (e.g., at least one of PUCCH, PUSCH, SRS, and PRACH) through the unlicensed band needs to perform the channel access procedure before the first symbol for which the uplink signal or channel transmission is configured or indicated. Here, according to the size of a gap between transmission start time of the uplink/downlink signal or channel configured or indicated for the terminal and transmission ending time of the uplink/downlink signal or channel before the start time, the terminal may perform the channel access procedure of type 2 to type 3 and transmit the configured or indicated uplink signal or channel. For example, if the size of a gap between the transmission start time of the uplink/downlink signal or channel configured or indicated for the terminal and the transmission ending time of the uplink/downlink signal or channel before the start time is 25 μs, the terminal may perform the type 2 channel access procedure for 25 μs. For another example, if the size of a gap between the transmission start time of the uplink/downlink signal or channel configured or indicated for the terminal and the transmission ending time of the uplink/downlink signal or channel before the start time is equal to or less than 16 μs, the terminal may perform the type 2 channel access procedure for 16 μs or may perform the type 3 channel access procedure.

In addition, since transmission of the uplink/downlink signal or channel is performed in units of symbols in a general LTE or NR system, a case where the size of a gap becomes larger than 25 μs may occur. For example, in a case of performing uplink/downlink communication at 15 kHz subcarrier spacings, the length of 1 symbol is approximately 72 μs, which may be larger than the size of a gap interval for performing the channel access procedure of type 2 to type 3. Accordingly, in order to guarantee a gap corresponding to a predetermined time, the base station or the terminal may transmit the uplink/downlink signal or channel within a time corresponding to a symbol (for example, from (symbol length-necessary gap length) to symbol ending time).

A signal or channel transmitted for a part of a time corresponding to a symbol may be an extended cyclic prefix (CP) for the uplink signal transmission start symbol configured or indicated for the terminal by the base station, may be a signal or channel for which the entire transmission start symbol or a part thereof is copied, or may be a signal or a channel for which the entire transmission start symbol or a part thereof is subject to cyclic prefix extension. Hereinafter, for convenience of description, in the disclosure, it is expressed as a cyclic prefix extension or CP extension. Meanwhile, the cyclic extension signal or channel may be transmitted through one or more symbols. For example, in symbol 1-1 immediately before the uplink signal transmission start symbol 1, configured or indicated for uplink signal transmission, the entire uplink signal transmission start symbol 1 is cyclically extended and transmitted. Through the symbol 1-2, it is also possible to transmit a cyclic extension signal or channel of the uplink signal transmission start symbol 1 (or the duplicated symbol 1-1) configured or indicated for uplink signal transmission. The entire uplink signal transmission start symbol 1 being cyclically extended and transmitted through the symbol 1-1 immediately before the uplink signal transmission start symbol 1 configured or indicated for uplink signal transmission may have the same meaning as the uplink signal transmission start symbol 1 being copied and transmitted through symbol 1-1 or the uplink signal transmission start symbol 1 being transmitted or retransmitted through symbol 1-1.

An example of cyclic expansion will be described as follows. In case that the first OFDM symbol l allocated for transmission of the configured or indicated uplink signal or channel is subject to cyclic extension, a temporal continuous signal in the time interval $T_{symb,l}^{\mu}-T_{ext} \leq t < T_{symb,l}^{\mu}$ before the first symbol is expressed as Equation 1 below.

$$s_{l-1}^{(p,\mu)} = -s_l^{(p,\mu)}(t-N_{CP,l}^{\mu}T_c) \quad T_{symb,l}^{\mu}-T_{ext} \leq t < T_{symb,}$$
$$\mu^{\mu}T_{symb,l}^{\mu}=(N_u^{\mu}-N_{CP,l}^{\mu})T_c \quad \text{Equation 1}$$

Here, s (PH) is a temporal continuous signal of an antenna port p and a subcarrier spacing μ in OFDM symbol 1. $T_{ext}$ is shown in Table 9 below, and $T_{TA}$ may be timing advance (TA) applied in case that the terminal transmits the configured or indicated uplink signal. Meanwhile, Equation 1 is only an example of cyclic expansion, and is not limited to Equation 1 above. In Table 9, $C_2$ and $C_3$ are integers, and may be pre-defined between the base station and the terminal, or may be configured for the terminal through a higher signal. Here, the values of $C_2$ and $C_3$ may be defined as $C_2$=ceiling (16 μs+$T_{TA}/T_{symb,l}^{\mu}$) or $C_3$=ceiling (25 μs+$T_{TA}/T_{symb,l}^{\mu}$). In this case, Table 9 is an example of expressing the cyclic extension interval and is not limited thereto.

TABLE 9

| Index | μ = 0 | μ = 1 | μ = 2 |
|---|---|---|---|
| 0 | 0 | 0 | 0 |
| 1 | $T_{symb,l}^{\mu} - 25 \cdot 10^{-6}$ | $T_{symb,l}^{\mu} - 25 \cdot 10^{-6}$ | $2T_{symb,l}^{\mu} - 25 \cdot 10^{-6}$ |
| 2 | $C_2 T_{symb,l}^{\mu} - 16 \cdot 10^{-6} - T_{TA}$ | $C_2 T_{symb,l}^{\mu} - 16 \cdot 10^{-6} - T_{TA}$ | $C_2 T_{symb,l}^{\mu} - 16 \cdot 10^{-6} - T_{TA}$ |
| 3 | $C_3 T_{symb,l}^{\mu} - 25 \cdot 10^{-6} - T_{TA}$ | $C_3 T_{symb,l}^{\mu} - 25 \cdot 10^{-6} - T_{TA}$ | $C_3 T_{symb,l}^{\mu} - 25 \cdot 10^{-6} - T_{TA}$ |

In case that the channel is in an idle state during a sensing period of at least 9 μs, the base station may first perform downlink signal transmission in the channel occupation time period immediately after the sensing period. If the channel is busy, no transmission is performed by the base station during the channel occupation interval. In a case where a gap between consecutive downlink signal transmission intervals is 16 μs or more, the base station may perform downlink signal transmission within the channel occupancy time if the channel is in an idle state during a sensing period of at least 9 μs. If a gap between the downlink signal transmission interval and the uplink signal transmission interval is at most 16 μs, the base station may perform downlink signal transmission after the uplink signal transmission interval without channel sensing.

In case that the terminal searches for a transmission interval of a downlink signal transmitted from the base station within the channel occupation interval and then performs uplink signal transmission, if a gap between two uplink signal transmission intervals is 16 μs or more, the terminal may perform uplink signal transmission if the sensed channel is idle for at least 9 μs within 25 μs immediately before uplink transmission. If the gap is within at most 16 μs, the terminal may perform uplink signal transmission after the downlink signal transmission interval without channel sensing.

No transmission is performed by the base station and the terminal within the idle period 720 immediately before the start of the next channel occupation interval. The corresponding idle period is determined as the larger value between 0.05*FFP and 100 μs. The FFP may be preconfigured as one of the values within 1 ms to 20 ms through a higher signal.

If channel access fails before uplink signal transmission, the terminal notifies the base station of channel failure information through an L1 or higher signal.

Subsequent embodiments provide a method considering the characteristics of PUSCH repetition transmission type B in an unlicensed band. In particular, although it is mainly described for CG PUSCH repetition transmission without scheduling DCI, it is sufficiently applicable to PUSCH repetition transmission through DCI scheduling.

Embodiment 1

Embodiment 1 provides a method of supporting PUSCH repetition transmission type B in an unlicensed band. As described above in FIGS. 6 and 7, in the unlicensed band, the base station and the terminal may perform second downlink (or uplink) signal transmission without channel sensing, even within the channel occupancy time period, according to the gap value between first downlink (or uplink) signal transmission and second downlink (or uplink) signal transmission; or after performing channel sensing for a predetermined value, if a result of the channel sensing is idle, the base station and the terminal may perform second downlink (or uplink) signal transmission, and if the result of the channel sensing is busy, the base station and the terminal may not perform the second downlink (or uplink) signal transmission. The downlink signal transmission may correspond to channels such as PDCCH and PDSCH, and the uplink signal transmission may correspond to channels such as PUCCH, PUSCH, SRS, and PRACH.

In case that the PUSCH repetition transmission type B is applied in the unlicensed band, in a case where the terminal is scheduled by the base station or receives the configuration of semi-persistent periodic resource, in a situation where L, which is the length indicator value, is not 1, if the PUSCH transmission symbol according to the actual PUSCH repetition is 1 symbol, the terminal may omit the corresponding actual PUSCH repetition transmission. Embodiment 1 considers an actual PUSCH repetition transmission method having a length of 1 symbol generated in a situation other than L=1.

In the licensed band, the terminal may transmit TB through repetition transmission even if transmission of the actual PUSCH repetition, which is 1 symbol, does not occur. However, in the unlicensed band, in case that transmission of the actual PUSCH repetition, which is 1 symbol, does not occur, since a gap of 1 symbol may occur between consecutive actual PUSCH repetition transmission intervals, the terminal has a burden of additionally performing channel sensing (or LBT). For example, in FIG. 5, in case that PUSCH repetition transmission type B is scheduled for the terminal by DCI or is configured using a periodic resource, as indicated by reference numeral 500, the terminal performs actual transmission, as indicated by reference numeral 520, through actual PUSCH repetitions 530, 534, 536, and 540. In the unlicensed band, a 1 symbol gap occurs between the PUSCH 530 and the PUSCH 534 and between the PUSCH 536 and the PUSCH 540. Therefore, during a predetermined interval immediately before the terminal transmits the PUSCH 534 and the PUSCH 543, the terminal may transmit the PUSCH 534 and the PUSCH 543 only in case that the sensing result is determined to be idle through channel sensing, respectively.

As described above in FIG. 7, in case that the channel sensing mode is a semi-static mode, whether to perform sensing is determined according to whether the gap is within 16 µs or exceeds the same. Based on the normal cyclic prefix, the length of 1 symbol is about 71 µs at 150 kHz subcarrier spacing, the length of 1 symbol is about 35 µs at 30 kHz subcarrier spacing, the length of 1 symbol is about 17 µs at 60 kHz subcarrier spacing, and the length of 1 symbol is about 8 µs at 120 kHz subcarrier spacing. Therefore, even if the actual PUSCH repetition configured by 1 symbol is omitted at 120 kHz, no big problem occurs even if the 1 symbol actual PUSCH repetition is omitted because the gap is within 16 µs. However, if 1 symbol actual PUSCH repetition is omitted in other subcarrier spacings, separate channel sensing needs to be performed for subsequent PUSCH transmission, and PUSCH transmission can be performed only in case that the channel is determined to be idle. Accordingly, at least one of the following methods or combinations of methods may be considered.

Method 1-1: In case that higher signal configuration related to the unlicensed band is provided to the terminal or the terminal reports terminal capability related to the unlicensed band to the base station, the terminal transmits the corresponding actual PUSCH without omission thereof even if the actual PUSCH is 1 symbol at the time of transmission of PUSCH repetition transmission type B. Alternatively, other than a case (i.e., in the licensed band) where the higher signal configuration related to the unlicensed band is provided to the terminal or the terminal reports terminal capability related to the unlicensed band to the base station, the terminal may omit the corresponding actual PUSCH if the actual PUSCH is 1 symbol at the time of transmission of PUSCH repetition transmission type B. The higher signal configuration related to the unlicensed band or the terminal capability related to the unlicensed band may be an example of channel access-related higher signal information or terminal capability that is essential in the unlicensed band. In case that a PUCCH or PUSCH including UCI information partially overlaps the resources of the PUSCH repetition transmission type B, the terminal performs transmission by including the UCI information in the first actual PUSCH among overlapping actual PUSCHs of the PUSCH repetition transmission type B. If the first actual PUSCH is configured by 1 symbol, the terminal transmits the UCI information by including the same in the first actual PUSCH that is not 1 symbol among the overlapping actual PUSCHs. If the PUCCH or PUSCH including the UCI overlaps the actual PUSCHs and the overlapping actual PUSCHs all are 1 symbol, the terminal may drop the actual PUSCH transmission and transmit the PUCCH or PUSCH including the UCI.

Method 1-2: In addition to method 1-1, in case that the last actual PUSCH among repeatedly transmitted actual PUSCHs in PUSCH repetition transmission type B is 1 symbol, the terminal may omit transmission of the corresponding actual PUSCH.

Method 1-3: In addition to method 1-1, if the first actual PUSCH repetition among repeatedly transmitted actual PUSCHs in PUSCH repetition transmission type B is 1 symbol, the corresponding actual PUSCH repetition may be omitted or not according to terminal implementation. Alternatively, according to the terminal implementation, if the terminal performs channel sensing before transmitting the first actual PUSCH repetition of the channel, in case that the sensing result is idle, the terminal transmits the corresponding 1 symbol actual PUSCH repetition, and in case that the sensing result is busy, the terminal may omit transmission of 1 symbol actual PUSCH repetition. That is, whether or not to transmit 1 symbol actual PUSCH repetition may be determined according to the channel sensing result.

Method 1-4: The transmission length of a PUSCH preceding or following the 1 symbol actual repetition PUSCH that has been omitted may be extended by 1 symbol. For example, in a situation where actual PUSCH repetitions of PUSCH 1, PUSCH 2, and PUSCH 3 are determined as being 3 symbols, 1 symbol, and 4 symbols, respectively, the PUSCH repetition transmission type B may be performed in a manner such that the terminal considers that PUSCH 2 of 1 symbol is omitted, and instead, PUSCH 1 is actually scheduled with 4 symbols or PUSCH 3 is configured and scheduled with 5 symbols. Accordingly, through this method, the terminal may transmit PUSCH 1 of 4 symbols and PUSCH 3 of 4 symbols, or may transmit PUSCH 1 of 3 symbols and PUSCH 3 of 5 symbols. The PUSCH to which the 1 symbol is added may be determined in consideration of a slot boundary or an invalid symbol position. Here, it is required to determine the resource amount of PUSCH in order to determine the TBS. At this time, the TBS may be determined based on the first scheduled time period of actual PUSCH repetition or the first scheduled time period of nominal repetition. In general, the TBS may be determined by the L value included in the scheduling DCI. Alternatively, as described above, a value extended by 1 symbol may be additionally considered and used for determination of the TBS.

Method 1-5: This is a method of extending a cyclic prefix (CP) of the first symbol during the transmission interval of the next PUSCH of the omitted 1-symbol actual repetition PUSCH. This is called CP extension and can be used to reduce a gap interval. The length of the CP extension may be determined by a subcarrier spacing or a value which is configured as the CP extension by the base station. For example, in a situation in which PUSCH 1, PUSCH 2, and PUSCH 3 are determined as actual PUSCH repetitions having 3 symbols, 1 symbol, and 4 symbols, respectively, PUSCH 2 of 1 symbol is omitted, and the first symbol of PUSCH 3 configured by 4 symbols is subject to CP extension to enable the gap between PUSCH 1 and PUSCH 3 to be within 16 µs. The CP extension may be determined by the terminal through calculation of a CP extension value based on the subcarrier spacing and the number of omitted symbols without separate scheduling DCI. Alternatively, in relation to the CP extension, it may be possible for the terminal to apply the CP extension value through scheduling DCI or a higher signal previously received by the terminal.

The above-described methods can be applied only in case that the gap between the 1 symbol actual repetition PUSCH and another adjacent PUSCH is 0 symbols. For example, in a situation where PUSCH 1, PUSCH 2, and PUSCH 3 are 3 symbols, 1 symbol, and 4 symbols, respectively, if an invalid symbol of at least 1 symbol exists between PUSCH 1 and PUSCH 2 and between PUSCH 2 and PUSCH 3, the terminal omits PUSCH 2 transmission of 1 symbol. The above methods are not limited to PUSCH repetition transmission type B, but may also be applied to PUSCH repetition transmission type A.

Figure 8:
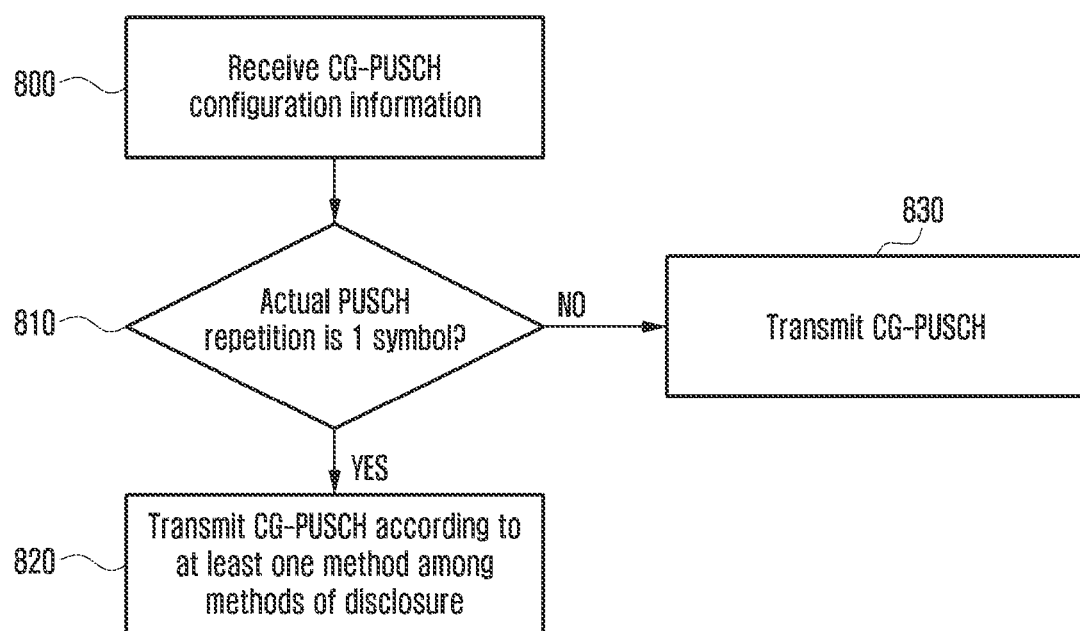
FIG. 8 is a flowchart illustrating an embodiment of a method in which a terminal applies a PUSCH repetition transmission type B in an unlicensed band according to an embodiment of the disclosure.

FIG. 8 is a flowchart illustrating an embodiment of a method for applying PUSCH repetition transmission type B in an unlicensed band by a terminal according to an embodiment of the disclosure.

Referring to FIG. 8, first, the terminal may receive CG-PUSCH configuration information from a base station in operation 800. Further, in case that the PUSCH repetition transmission type B is applied in the unlicensed band, the terminal determines whether the actual PUSCH repetition is 1 symbol, based on the CG-PUSCH configuration information, in operation 810. Current embodiment 1 proposes a transmission method in a case where the terminal does not omit transmission of the actual PUSCH repetition having a length of 1 symbol, generated in a situation other than L=1. In this case, the terminal may operate according to the above-described method (methods 1-1, 1-2, 1-3, 1-4, and 1-5) in operation 820. If the length of the actual PUSCH repetition is not 1 symbol in a situation other than L=1, the terminal may transmit the corresponding PUSCH in operation 830. Specifically, in relation to 1 symbol actual PUSCH repetition, the terminal may determine whether to transmit 1 symbol actual PUSCH repetition according to the location of the repeatedly transmitted actual PUSCH (methods 1-1 to 1-2) or the channel sensing result (method 1-3). In addition, in case that the actual repetition PUSCH of 1 symbol is omitted, the terminal may extend the transmission length of the previous PUSCH or the next PUSCH by 1 symbol (method 1-4), or may extend the CP of the first symbol in the transmission interval of the next PUSCH (method 1-5).

Embodiment 2

Figure 9:
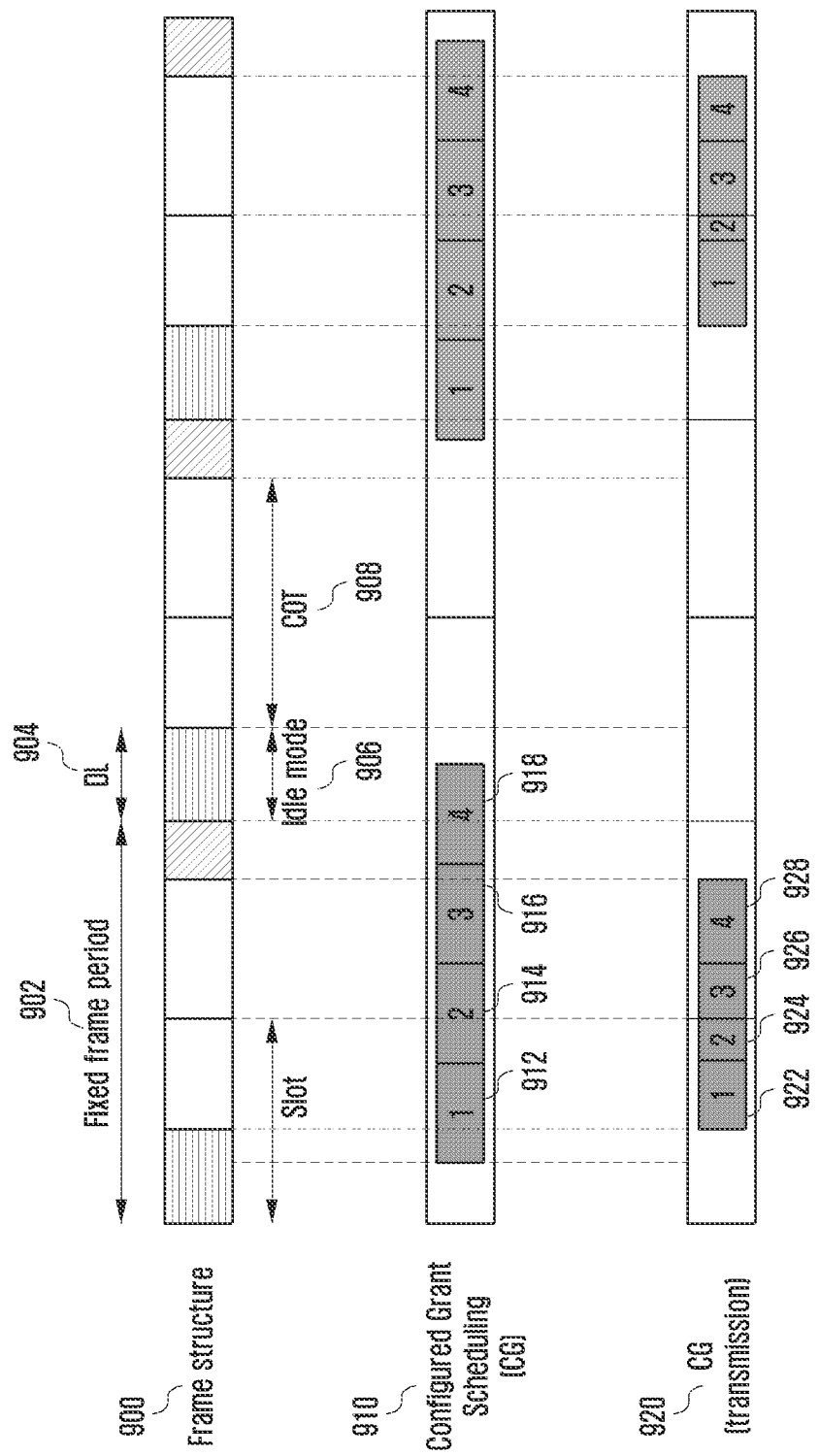
FIG. 9 illustrates an embodiment of a case in which an invalid symbol exists in frame-based equipment (FBE) according to an embodiment of the disclosure.

FIG. 9 illustrates an embodiment of a case in which an invalid symbol exists in FBE according to an embodiment of the disclosure.

Referring to FIG. 9, embodiment 2 describes a terminal operation for a CG PUSCH based on PUSCH repetition transmission type B in a case of FBE. FBE may be considered as a semi-static channel access procedure. In Type B-based CG PUSCH repeated transmission, a nominal repetition resource may be determined by a start symbol, a symbol length, and the number of repeated transmissions based on higher signal configuration, and one nominal repetition may be segmented into one or more actual PUSCH repetitions by an invalid symbol and a slot boundary. Here, symbols corresponding to an idle mode 906 may also be considered as invalid symbols. Alternatively, symbols corresponding to max (0.05·Tx, 100 µs) before the start of the next COT period may be considered invalid symbols. Tx 902 in frame structure 900 corresponds to the FFP 700 of FIG. 7, and is a value determined by a higher signal. Alternatively, with respect to all symbols other than a COT period 908 configured in 910 by the base station, the terminal may consider the symbols as invalid symbols, and may consider the same in configuration of repetition transmission Type B-based CG PUSCH resource.

Thereafter, as previously described in the disclosure, invalid symbols are determined for the scheduled k nominal repetitions 912, 914, 916, and 918, and then the terminal in 920 may consider the remaining symbols as valid symbols 922, 924, 926, and 928. If one or more valid symbols are included in each of nominal repetitions 912, 914, 916, and 918, the nominal repetition may include one or more actual PUSCH repetitions. Here, each actual PUSCH repetition includes a consecutive set of valid symbols that can be used for PUSCH repetition type B in one slot. Therefore, in an environment operating as FBE in the unlicensed band, if the terminal determines resources for actual PUSCH repetition for the PUSCH repetition transmission type B, an idle period 906 in the FFP, a period other than a COT 908 occupied by the base station (ex., downlink (DL) 904), or a period other than the COT 908 occupied by the terminal may be regarded as invalid symbols.

During COT occupied by the terminal, the terminal may denote a terminal that transmits PUSCH repetition transmission type B or a terminal other than a base station. The COT information may be provided to the terminal before the terminal transmits the PUSCH repetition transmission type B via the L1 signal or higher signal configuration. In addition, the PUSCH repetition transmission type B of the terminal may be limited only within the COT period occupied by the base station (or terminal). If the PUSCH resource, which falls out of the COT period occupied by the base station (or terminal), exists in a situation in which the resource configuration and period of the PUSCH repetition transmission type B that can be transmitted without scheduling DCI is given in advance, the terminal may perform only the PUSCH repetition transmission type B within the COT period. For example, in a case where there are a total of three actual PUSCHs (PUSCH 1, PUSCH 2, and PUSCH 3) of CG PUSCH repetition transmission type B and resources thereof are determined based on the invalid symbol determined through the above method, the terminal may perform only repetition transmission type B of PUSCH 1 and PUSCH 2 and may omit transmission of PUSCH 3 if the resource of PUSCH 3 falls out of the COT period occupied by the base station (or terminal). Alternatively, the terminal may additionally perform a separate LBT for PUSCH 3 transmission.

Figure 10:
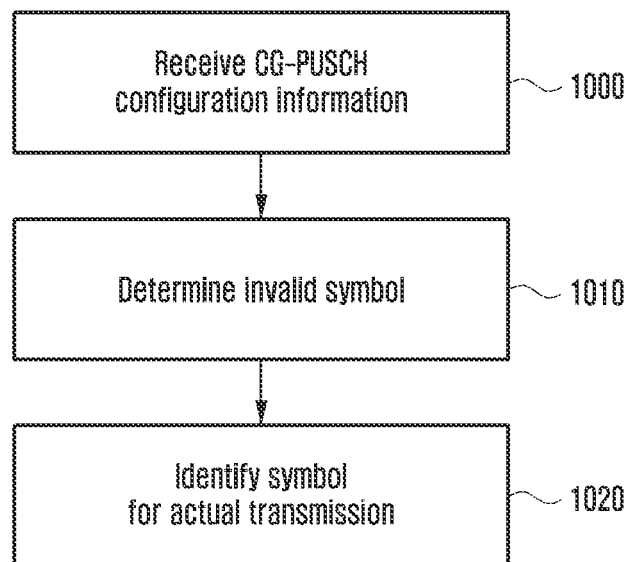
FIG. 10 is a flowchart illustrating an embodiment of a case in which an invalid symbol exists in FBE according to an embodiment of the disclosure.

FIG. 10 is a flowchart illustrating an embodiment for a case in which an invalid symbol exists in FBE according to an embodiment of the disclosure.

Referring to FIG. 10, first, a terminal may receive CG-PUSCH configuration information from a base station in operation 1000. Further, the terminal determines an invalid symbol through the above method in operation 1010. The terminal may regard, as invalid symbols, symbols corresponding to the idle mode 906, symbols corresponding to max (0.05·Tx, 100 μs) before the next COT period starts, or all symbols other than the COT period 908 configured by the base station. In case that invalid symbols are determined through the above method, the terminal identifies symbols for transmission of actual PUSCH in operation 1020, and in some cases, one nominal repetition may be segmented into one or more actual PUSCH repetitions by the invalid symbol and the slot boundary. Thereafter, the terminal performs PUSCH transmission through the identified symbol.

Embodiment 3

At the time of transmission of CG PUSCH in an unlicensed band, a terminal may piggyback control information related to the corresponding PUSCH transmission to the CG PUSCH in the form of CG-UCI, and may include the CG-UCI in all CG PUSCH transmissions. The CG-UCI information may include at least one of 4-bit HARQ process number, 2-bit RV value, 1-bit NDI, and n-bit COT sharing information. In a case of CG PUSCH repetition transmission type B, since the actual PUSCH is repeatedly transmitted only for the actual valid symbol based on invalid information, symbol lengths between repeatedly transmitted actual PUSCHs may differ. If polar coding is applied to the size of specific UCI, combining between UCIs may not be performed if the lengths of repeatedly transmitted CG PUSCHs on which the corresponding UCIs are piggybacked are not the same. In order to combine UCIs included in the repeatedly transmitted CG PUSCH, the corresponding UCI and CG PUSCH need to have the same rate-matched resource therein. Accordingly, in case that the repeatedly transmitted CG PUSCHs have different lengths, the corresponding UCI and CG PUSCH may have different rate-matched resources, and thus the base station cannot combine the repeatedly transmitted UCIs. Therefore, in order to solve this problem, at least one of the following methods or a combination thereof may be considered.

Method 3-1: This is a method in which a terminal performs transmission by including all pieces of CG-UCI in PUSCH repetition transmission type B, but a base station decodes each piece of CG-UCI without separate combining thereof, so as to obtain repeatedly transmitted PUSCH information. There is a possibility the terminal performs a different CG-UCI encoding in consideration of actual PUSCH. Further, the base station does not unconditionally perform combining, and may decode UCIs included in the actual PUSCH having the same symbol length at least assuming that the UCIs are combinable. In addition, this method is applicable in case that the information size of UCI is 12 bits or more. As an example, in case that the CG-UCI information includes all of 4-bit HARQ process number, 2-bit RV value, 1-bit NDI, and n-bit COT shared information, if a bit size of the COT shared information is 5 bits or more, the method can be applied. Polar coding may be applied only if the bit size of the COT shared information is 12 bits or more, and Reed-Muller code (or channel coding of small block lengths) may be applied if the bit size of the COT shared information is smaller than 12 bits.

Method 3-2: The terminal performs transmission including all pieces of CG-UCI in PUSCH repetition transmission type B, and in this case, the information size of CG-UCI may be configured to be always smaller than 12 bits. Therefore, as an example, assuming that the CG-UCI information includes all of 4-bit HARQ process number, 2-bit RV value, 1-bit NDI and n-bit COT shared information, the base station may configure the bit size of COT shared information to be 4 bits or less. Alternatively, the COT sharing information may be omitted. Accordingly, the terminal may repeatedly transmit UCI regardless of the symbol length of the actual PUSCH, and the base station may decode pieces of repeated UCI information.

Method 3-3: In case that CG-UCI is included in PUSCH repetition transmission type B, the corresponding CG-UCI may be included in the first actual PUSCH or the last actual PUSCH among actual PUSCHs excluding 1-symbol actual PUSCH, or may be included in only a specific (n-th) actual PUSCH preconfigured by the base station.

Method 3-4: CG-UCI information may be included in all GG PUSCHs, which are repeatedly transmitted, or a specific CG PUSCH, according to the UCI information size. This method may be a combination of method 3-2 (or method 3-1) and method 3-3. For example, in case that the size of CG-UCI information preconfigured via a higher signal is 12 bits or more, the terminal maps the CG-UCI information only to a specific CG-PUSCH of CG PUSCH repetition transmission type B and transmits the same. However, in case that the size of CG-UCI information preconfigured via a higher signal is 11 bits or less, the terminal may map CG-UCI information to all CG-PUSCHs of CG PUSCH repetition transmission type B and transmit the same. The base station may preconfigure the size and the type of CG-UCI information for the terminal via a higher signal, and different CG-UCI types and bit sizes thereof may be configured for respective CG PUSCH configurations.

Figure 11:
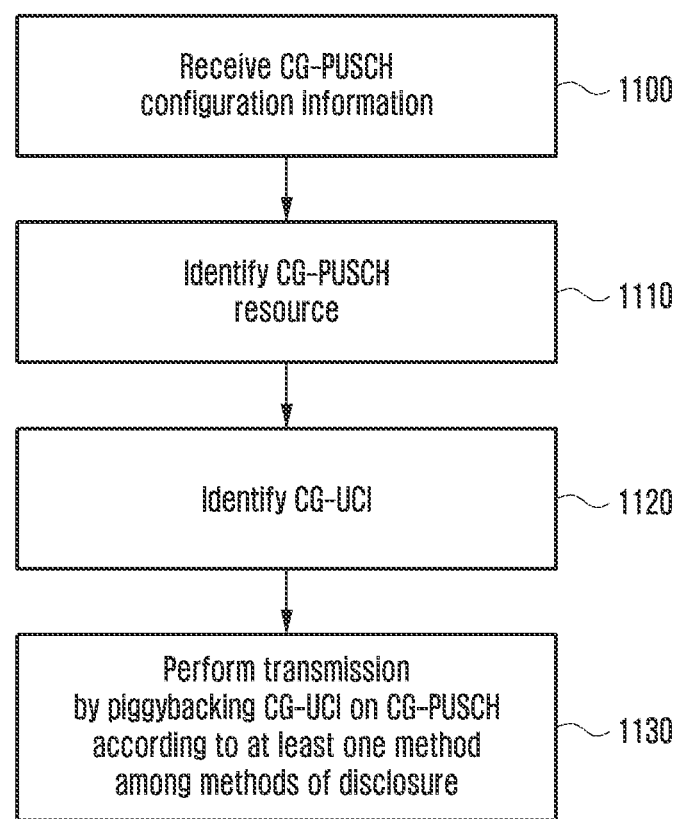
FIG. 11 is a flowchart illustrating an embodiment in which a terminal piggybacks on a configured grant (CG) PUSCH in the form of CG-uplink control information (UCI) at the time of transmission of the CG PUSCH in an unlicensed band according to an embodiment of the disclosure.

FIG. 11 is a flowchart illustrating an embodiment in which a terminal piggybacks on a CG PUSCH in the form of CG-UCI at the time of transmission of CG PUSCH in an unlicensed band according to an embodiment of the disclosure.

Referring to FIG. 11, a terminal may receive CG-PUSCH configuration information from a base station in operation 1100. Thereafter, the terminal may identify a CG-PUSCH resource in operation 1110, may identify CG-UCI in operation 1120, and may perform CG PUSCH transmission in the unlicensed band. At the time of transmission of the CG PUSCH, the terminal may transmit a CG PUSCH by piggybacking control information related to the corresponding PUSCH transmission on the CG PUSCH in the form of CG-UCI in operation 1130. As a method of piggybacking UCI in FIG. 11, at least one of the methods described above may be combined. Specifically, as a method of piggybacking the CG-UCI on the CG PUSCH, the lengths of repeatedly transmitted CG PUSCHs may be the same or different, and the information size of UCI may be configured to be 12 bits or more or to be less than 12 bits. Alternatively, CG-UCI information may be included in all GG PUSCHs that are repeatedly transmitted, or CG-UCI information may be included in a specific CG PUSCH.

Figure 12:
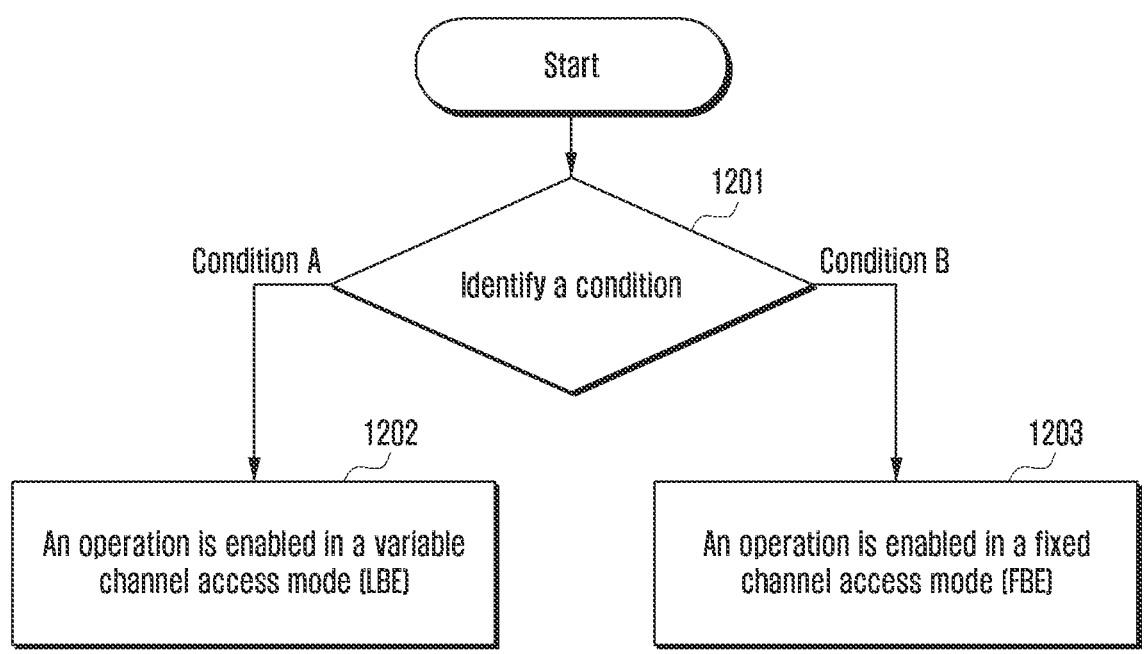
FIG. 12 is a flowchart illustrating an operation of selecting a specific channel access mode according to a condition according to an embodiment of the disclosure.

FIG. 12 is a flowchart illustrating an operation of selecting a specific channel access mode according to a condition according to an embodiment of the disclosure.

Referring to FIG. 12, it is a flowchart illustrating a method of selecting a fixed channel access method (FBE) and a variable channel access method (LBE) described above with reference to FIGS. 6 to 10. As described above, the fixed channel access method is a method in which a transmission side (terminal or base station) discovers a channel every fixed period. In the variable channel access method, when there is data to be transmitted, without a fixed period, by the transmission side, one of four categories of LBT operations described above is performed. Compared to the fixed channel access method, according to the variable channel access method, channel access may be immediately performed when a buffer of the transmission side includes data, and data transmission may occur when it is determined that the channel is in an idle state. On the other hand, according to the fixed channel access method, even if data exists in the buffer of the transmission side, channel access can be performed at every specific interval during a fixed period, and thus channel access can be performed after waiting for a predetermined period of time. Therefore, according to the variable channel access method, with regard to the latency, data transmission of the transmission side can be performed faster. However, according to the variable channel access method, when it is determined that the channel is in a busy state during channel discovery, data transmission can be performed only after identifying that the channel is in the idle state for a predetermined period due to random backoff. As a method for the terminal to determine whether the channel is busy or idle, when the strength of a signal received through an antenna for a predetermined period of time (e.g., 9 µs, 16 µs, or another value obtained by combination of these values, a*9 µs+b*16 µs, here, a and b are integers) is less than a predetermined threshold value, the terminal may determine that the channel is idle, and when the strength of the signal is equal to or greater than the predetermined threshold value, the terminal may determine that the channel is busy. When the random backoff time is longer than the fixed period, there is a possibility that the data transmission latency through the variable channel access method increases compared to that of the fixed channel access method. Therefore, in a case of a service sensitive to latency such as URLLC, a method of adaptively selecting LBE or FBE according to specific conditions may be required. In a case of condition A is identified in operation 1201, operation is enabled in a variable channel access mode in 1202, and in a case of condition B is identified in operation 1201, operation is enabled in a fixed channel access mode in 1203. In a case of condition A, at least one of the following or a combination thereof may be applied.

Condition A-1: Probability of being in an idle mode is equal to or greater than a predetermined threshold value Condition A-2: Probability of being in an idle mode is equal to or less than a predetermined threshold value Condition A-3: Probability of being in a busy mode is equal to or greater than a predetermined threshold value Condition A-4: Probability of being in a busy mode is equal to or less than a predetermined threshold value Condition A-5: The fixed frame period is equal to or greater than a predetermined threshold value Condition A-6: The fixed frame period is equal to or less than a predetermined threshold value Condition A-7: When a non-3GPP-based unlicensed band device such as Wi-Fi exists nearby Condition A-8: When operation for sidelink (communication between a terminal and a terminal without intervention of a base station) is enabled Condition A-9: When the number of accessed terminals within one base station is equal to or greater than a predetermined threshold value In a case of condition B, at least one of the following or a combination thereof may be applied.

Condition B-1: Probability of being in an idle mode is equal to or greater than a predetermined threshold value Condition B-2: Probability of being in an idle mode is equal to or less than a predetermined threshold value Condition B-3: Probability of being in a busy mode is equal to or greater than a predetermined threshold value Condition B-4: Probability of being in a busy mode is equal to or less than a predetermined threshold value Condition B-5: The fixed frame period is equal to or greater than a predetermined threshold value Condition B-6: The fixed frame period is equal to or less than a predetermined threshold value Condition B-7: If there is no non-3GPP-based unlicensed band device such as Wi-Fi nearby Condition B-8: When operation for sidelink (communication between a terminal and a terminal without intervention of a base station) is enabled Condition A-9: When the number of accessed terminals within one base station is equal to or less than a predetermined threshold value Among the conditions, a method of determining the probability of being in an idle mode or the probability of being in a busy mode may be based on a value that can be determined by performing sensing a predetermined number of times by the terminal or the base station for a predetermined period of time. For example, if the base station performs sensing 10 times and 8 times of the sensing are determined to be an idle mode, the base station determines the probability of being in the idle mode to be 80%.

As one of the possible combinations of the condition A and the condition B, when the probability of being in the idle mode is equal to or greater than a predetermined threshold value (A-1), operation in the variable channel access mode is enabled. Alternatively, when the probability of being in the idle mode is equal to or less than a predetermined threshold value (B-2), operation in the fixed channel access mode is enabled.

The subject determining the LBE and the FBE may be a base station or a terminal. When the base station is the subject, the base station may determine one of the LBE and the FBE, and may transmit the selected information to terminals in the base station through a higher signal. In the above situation, all terminals in the base station may use the same channel access method. When the terminal is the subject, the terminal may perform condition determination regardless of configuration by the base station, and may report the method determined by the terminal accordingly to the base station. According to the above method, there may exist a possibility that terminals have the same or different channel access methods even within the base station according to conditions determined by the terminal.

Figure 13:
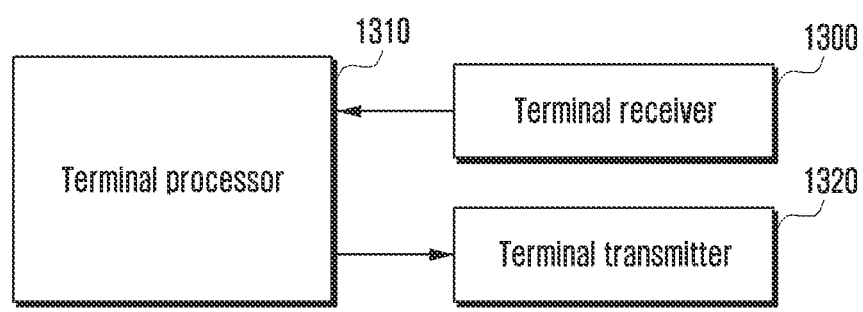
FIG. 13 is a block diagram illustrating a structure of a terminal according to an embodiment of the disclosure.

FIG. 13 is a block diagram illustrating a structure of a terminal according to an embodiment of the disclosure.

Referring to FIG. 13, the terminal of the disclosure may include a terminal receiver 1300, a terminal transmitter 1320, and a terminal processor 1310.

The terminal receiver 1300 and the terminal transmitter 1320 may be collectively referred to as a transceiver in the embodiment. The transceiver may transmit/receive a signal to/from the base station. The signal may include control information and data. To this end, the transceiver may include an RF transmitter for performing up-conversion of a frequency of a transmitted signal and amplification thereof, and an RF receiver for performing low-noise amplification of a received signal and down-conversion thereof. In addition, the transceiver may receive a signal through a wireless channel and output the signal to the terminal processor 1310, and may transmit a signal output from the terminal processor 1310 through the wireless channel.

The terminal processor 1310 may control a series of processes to enable the terminal to operate according to the embodiment described above.

Figure 14:
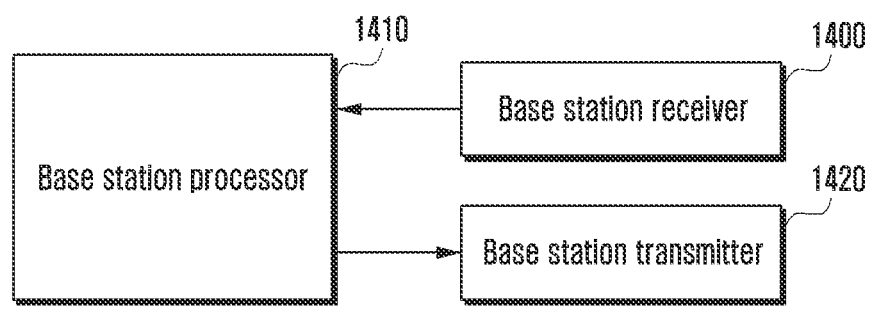
FIG. 14 is a block diagram illustrating a structure of a base station according to an embodiment of the disclosure.

FIG. 14 is a block diagram illustrating a structure of a base station according to an embodiment of the disclosure.

Referring to FIG. 14, in an embodiment, the base station may include at least one of a base station receiver 1400, a base station transmitter 1420, and a base station processor 1410.

The base station receiver 1400 and the base station transmitter 1420 may be collectively referred to as a transceiver in the embodiment. The transceiver may transmit/receive a signal to/from the terminal. The signal may include control information and data. To this end, the transceiver may include an RF transmitter for performing up-conversion of a frequency of a transmitted signal and amplification thereof, and an RF receiver for performing low-noise amplification of a received signal and down-conversion thereof. In addition, the transceiver may receive a signal through a wireless channel and output the signal to the base station processor 1410, and may transmit a signal output from the base station processor 1410 through the wireless channel.

The base station processor 1410 may control a series of processes to enable the base station to operate according to the embodiment described above.

In the drawings in which methods of the disclosure are described, the order of the description does not always correspond to the order in which operations of each method are performed, and the order relationship between the operations may be changed or the operations may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other variants based on the technical idea of the disclosure may implemented. Further, the above respective embodiments may be employed in combination, as necessary. For example, embodiments 1, 2 and 3 of the disclosure may be partially combined to operate a base station and a terminal. Further, although the above embodiments have been described by way of the NR system, other variants based on the technical idea of the embodiments may be implemented in other systems such as FDD or TDD LTE systems.

The disclosure relates to a communication technique for combining an IoT technology with a 5G communication system for supporting a higher data transmission rate than that of a beyond-4G system, and a system therefor. The disclosure may be applied to intelligent services (for example, smart homes, smart buildings, smart cities, smart cars or connected cars, health care, digital education, retail businesses, security and safety related services, and the like) based on 5G communication technologies and IoT-related technologies.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, configured grant configuration associated with a physical uplink shared channel (PUSCH) repetition type B;
   determining at least one invalid symbol for a PUSCH repetition type B transmission based on symbols in an idle duration for an operation with an unlicensed band channel access;
   considering remaining symbols as valid symbols for the PUSCH repetition type B transmission based on the at least one invalid symbol for the PUSCH repetition type B transmission; and
   performing the PUSCH repetition type B transmission using the valid symbols within a slot.

2. The method of claim 1, wherein the symbols in the idle duration is considered as the at least one invalid symbol.

3. The method of claim 1, wherein a semi static channel access is used for the unlicensed band channel access.

4. The method of claim 1,
   wherein, in case that a number of the valid symbols for the PUSCH repetition type B transmission is greater than zero for a nominal repetition, the nominal repetition consists of one or more actual repetitions, and
   wherein each actual repetition consists of a consecutive set of all valid symbols.

5. The method of claim 4, wherein the consecutive set of all valid symbols is used for the PUSCH repetition type B transmission.

6. A method performed by a base station in a wireless communication system, the method comprising:
   transmitting, to a terminal, configured grant configuration associated with a physical uplink shared channel (PUSCH) repetition type B; and
   receiving, from the terminal, data on a PUSCH based on a PUSCH repetition type B transmission using valid symbols in a slot,
   wherein at least one invalid symbol for the PUSCH repetition type B transmission is determined based on symbols in an idle duration for an operation with an unlicensed band channel access, and
   wherein remaining symbols are considered as the valid symbols for the PUSCH repetition type B transmission based on the at least one invalid symbol for the PUSCH repetition type B transmission.

7. The method of claim 6, wherein the symbols in the idle duration is considered as the at least one invalid symbol.

8. The method of claim 6, wherein a semi static channel access is used for the unlicensed band channel access.

9. The method of claim 6,
   wherein, in case that a number of the valid symbols for the PUSCH repetition type B transmission is greater than zero for a nominal repetition, the nominal repetition consists of one or more actual repetitions, and
   wherein each actual repetition consists of a consecutive set of all valid symbols.

10. The method of claim 9, wherein the consecutive set of all valid symbols is used for the PUSCH repetition type B transmission.

11. A terminal in a wireless communication system, the terminal comprising:
a transceiver; and
a controller configured to:
receive, from a base station, configured grant configuration associated with a physical uplink shared channel (PUSCH) repetition type B,
determine at least one invalid symbol for a PUSCH repetition type B transmission based on symbols in an idle duration for an operation with an unlicensed band channel access,
consider remaining symbols as valid symbols for the PUSCH repetition type B transmission based on the at least one invalid symbol for the PUSCH repetition type B transmission, and
perform the PUSCH repetition type B transmission using the valid symbols within a slot.

12. The terminal of claim 11, wherein the symbols in the idle duration is considered as the at least one invalid symbol.

13. The terminal of claim 11, wherein a semi static channel access is used for the unlicensed band channel access.

14. The terminal of claim 11,
wherein, in case that a number of the valid symbols for the PUSCH repetition type B transmission is greater than zero for a nominal repetition, the nominal repetition consists of one or more actual repetitions, and
wherein each actual repetition consists of a consecutive set of all valid symbols.

15. The terminal of claim 14, wherein the consecutive set of all valid symbols is used for the PUSCH repetition type B transmission.

16. A base station in a wireless communication system, the base station comprising:
a transceiver; and
a controller configured to:
transmit, to a terminal, configured grant configuration associated with a physical uplink shared channel (PUSCH) repetition type B, and
receive, from the terminal, data on a PUSCH based on a PUSCH repetition type B transmission using valid symbols in a slot,
wherein at least one invalid symbol for the PUSCH repetition type B transmission is determined based on symbols in an idle duration for an operation with an unlicensed band channel access, and
wherein remaining symbols are considered as the valid symbols for the PUSCH repetition type B transmission based on the at least one invalid symbol for the PUSCH repetition type B transmission.

17. The base station of claim 16, wherein the symbols in the idle duration is considered as the at least one invalid symbol.

18. The base station of claim 16, wherein a semi static channel access is used for the unlicensed band channel access.

19. The base station of claim 16,
wherein, in case that a number of the valid symbols for the PUSCH repetition type B transmission is greater than zero for a nominal repetition, the nominal repetition consists of one or more actual repetitions, and
wherein each actual repetition consists of a consecutive set of all valid symbols.

20. The base station of claim 19, wherein the consecutive set of all valid symbols is used for the PUSCH repetition type B transmission.

* * * * *